United States Patent
Ooue

(10) Patent No.: US 8,352,054 B2
(45) Date of Patent: Jan. 8, 2013

(54) METHOD AND APPARATUS FOR PROCESSING DIGITAL AUDIO SIGNAL

(75) Inventor: Naoya Ooue, Gunma-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 959 days.

(21) Appl. No.: 12/382,855

(22) Filed: Mar. 25, 2009

(65) Prior Publication Data

US 2010/0010649 A1 Jan. 14, 2010

(30) Foreign Application Priority Data

Jul. 8, 2008 (JP) ................. 2008-177902

(51) Int. Cl.
*G06F 17/00* (2006.01)
(52) U.S. Cl. .............. 700/94; 84/622; 704/500
(58) Field of Classification Search .......... 700/94; 84/622, 624, 627, 659, 663; 704/500
See application file for complete search history.

(56) References Cited

U.S. PATENT DOCUMENTS

| 7,024,260 B2 | 4/2006 | Kuwaoka | |
| 2004/0098150 A1 * | 5/2004 | Okayama et al. | ............... 700/94 |

FOREIGN PATENT DOCUMENTS

| JP | 07-334180 | 12/1995 |
| JP | 11-126097 | 5/1999 |
| JP | 2002-189498 | 7/2002 |

* cited by examiner

*Primary Examiner* — Walter F Briney, III
(74) *Attorney, Agent, or Firm* — Louis Woo

(57) ABSTRACT

There is a sequence of samples having values representative of a waveform. Samples corresponding to extrema including maximums and minimums in the waveform are detected. A decision is made as to whether values of successive samples between every two extremum-corresponding samples are in an upward slope or a downward slope. The number of these successive samples is detected. One is selected from coefficients in response to the detected sample number. A first group has one or more samples adjacently preceding a maximum-corresponding sample. A second group has one or more samples adjacently following the maximum-corresponding sample. A third group has one or more samples adjacently preceding a minimum-corresponding sample. A fourth group has one or more samples adjacently following the minimum-corresponding sample. Each of specified samples among the samples in the first to fourth groups is corrected in response to the slope decision result and the selected coefficient.

12 Claims, 5 Drawing Sheets

METHOD AND APPARATUS FOR PROCESSING DIGITAL AUDIO SIGNAL

BACKGROUND OF THE INVENTION

1. Field of the Invention

This invention generally relates to a method and an apparatus for processing a digital audio signal. This invention particularly relates to a method and an apparatus for adding high-frequency-corresponding components to a digital audio signal to enhance the quality of audio contents represented by the digital audio signal.

2. Description of the Related Art

Typical conversion of an analog audio signal to a digital audio signal has a step of periodically sampling the analog audio signal at a prescribed sampling frequency to generate analog samples, and a step of changing the analog samples into corresponding digital samples constituting the digital audio signal. According to the Nyquist Theorem, the frequency of audio contents represented by the digital audio signal is limited to lower than the Nyquist frequency equal to a half of the sampling frequency.

The CD (compact disc) standards prescribe that a digital audio signal which results from analog-to-digital conversion of an analog audio signal at a sampling frequency of 44.1 kHz and a quantization bit number of 16 should be recorded on a CD. Therefore, the frequency of audio contents represented by the digital audio signal recorded on the CD is limited to lower than 22.05 kHz (the Nyquist frequency). Accordingly, components of the analog audio signal which have frequencies of 22.05 kHz or higher are lost during the analog-to-digital conversion to generate the digital audio signal. In general, such high-frequency components cause good presence or reality when audio contents represented by the analog audio signal are reproduced. Since the digital audio signal lacks high-frequency-corresponding components, audio contents reproduced from the digital audio signal tend to be poor in presence or reality.

U.S. Pat. No. 7,024,260 corresponding to Japanese Patent No. 3659489 discloses a method and an apparatus for shaping the waveform represented by a digital audio signal to compensate for lost high-frequency-corresponding components. In the method and the apparatus of U.S. Pat. No. 7,024,260, maximal and minimal values represented by samples of a digital audio signal are detected. A number of samples from a sample representing a minimal value to a maximum-value-corresponding sample is detected. A number of samples from a sample representing a maximal value to a minimal-value-corresponding sample is detected. Calculation is given of a first difference between the maximal-value-corresponding sample and the immediately-preceding sample. Calculation is given of a second difference between the minimal-value-corresponding sample and the immediately-preceding sample. First and second coefficients are calculated from the detected sample numbers. The first coefficient and the first difference are multiplied to generate a first multiplication result. The second coefficient and the second difference are multiplied to generate a second multiplication result. The maximal value represented by the maximal-value-corresponding sample is incremented by the first multiplication result. The minimal value represented by the minimal-value-corresponding sample is decremented by the second multiplication result.

According to the above signal processing in the method and the apparatus of U.S. Pat. No. 7,024,260, odd-order harmonics are added to the audio contents of a digital audio signal while even-order harmonics are not. Generally, concerning human hearing sense, odd-order harmonics with respect to a fundamental note tend to be uncomfortable and irritant to listeners. On the other hand, even-order harmonics tend to be comfortable. Therefore, in certain cases, audio contents reproduced from a digital audio signal generated by the method and the apparatus of U.S. Pat. No. 7,024,260 are uncomfortable to listeners.

Japanese patent application publication number 07-334180 corresponding to Japanese Patent No. 2888138 discloses an effect sound generating apparatus including a positive half-wave detecting circuit and a negative half-wave detecting circuit which receive an input audio signal. The positive half-wave detecting circuit and the negative half-wave detecting circuit divide the input audio signal into positive half waves and negative half waves. A first delay element defers the positive half waves by a first delay time to generate delayed positive half waves. A second delay element defers the negative half waves by a second delay time to generate delayed negative half waves. The first and second delay times can be determined independently of each other. A first attenuator damps the delayed positive half waves at a first attenuation to generate attenuated positive half waves. A second attenuator damps the delayed negative half waves at a second attenuation to generate attenuated negative half waves. A third attenuator damps the input audio signal at a third attenuation to generate an attenuated audio signal. The first, second, and third attenuations can be determined independently of one another. An adder sums the attenuated positive half waves, the attenuated negative half waves, and the attenuated audio signal to generate effect-sound-added audio signal. The effect-sound-added audio signal takes a synthesized waveform which can be selected from various waveforms in accordance with a combination of the first and second delay times, and the first, second, and third attenuations.

In the apparatus of Japanese application 07-334180, since the positive half waves and the negative half waves are processed separately, an amount of total signal processing tends to be great.

SUMMARY OF THE INVENTION

It is a first object of this invention to provide a method and an apparatus for processing a digital audio signal which generate even-order harmonics and add the generated even-order harmonics to the digital audio signal to enhance the quality of audio contents represented by the digital audio signal.

It is a second object of this invention to provide a method and an apparatus for processing a digital audio signal which generate even-order harmonics and odd-order harmonics and add the generated even-order and odd-order harmonics to the digital audio signal to enhance the quality of audio contents represented by the digital audio signal.

A first aspect of this invention provides a method of processing a digital audio signal having a sequence of samples having values representative of a waveform. The method comprises the steps of comparing values of temporally adjacent samples to detect extrema including local maximums and local minimums in the waveform, and to detect samples corresponding to the detected extrema respectively; deciding whether values of successive samples between samples corresponding to every two temporally adjacent extrema among the detected extrema are in an upward slope or a downward slope in the waveform; detecting a number of successive samples between samples corresponding to every two temporally adjacent extrema among the detected extrema; selecting one from coefficients in response to the detected sample number; calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum; calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum; multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and adding or subtracting the obtained multiplication result to or from a value of each of samples among the samples in the first, second, third, and fourth sample groups in response to whether values of successive samples between samples corresponding to every two temporally adjacent extrema among the detected extrema are decided to be in an upward slope or a downward slope in the waveform to generate harmonic components in the digital audio signal.

A second aspect of this invention is based on the first aspect thereof, and provides a method wherein the first calculating step calculates the first difference only and the second calculating step calculates the fourth difference only, and the adding or subtracting step adds the obtained multiplication result to a value of each of the samples in the first sample group and subtracts the obtained multiplication result from a value of each of the samples in the fourth sample group to generate even-order harmonic components and odd-order harmonic components in the digital audio signal.

A third aspect of this invention is based on the first aspect thereof, and provides a method wherein the first calculating step calculates the second difference only and the second calculating step calculates the third difference only, and the adding or subtracting step adds the obtained multiplication result to a value of each of the samples in the second sample group and subtracts the obtained multiplication result from a value of each of the samples in the third sample group to generate even-order harmonic components and odd-order harmonic components in the digital audio signal.

A fourth aspect of this invention is based on the first aspect thereof, and provides a method wherein the first calculating step calculates the first and second differences and the second calculating step calculates the third and fourth differences, and the adding or subtracting step adds the obtained multiplication result to a value of each of the samples in the first and third sample groups and subtracts the obtained multiplication result from a value of each of the samples in the second and fourth sample groups to generate even-order harmonic components only in the digital audio signal.

A fifth aspect of this invention is based on the first aspect thereof, and provides a method wherein the first calculating step calculates the first and second differences and the second calculating step calculates the third and fourth differences, and the adding or subtracting step adds the obtained multiplication result to a value of each of the samples in the second and fourth sample groups and subtracts the obtained multiplication result from a value of each of the samples in the first and third sample groups to generate even-order harmonic components only in the digital audio signal.

A sixth aspect of this invention provides an apparatus for processing a digital audio signal having a sequence of samples having values representative of a waveform. The apparatus comprises first means for comparing values of temporally adjacent samples to detect extrema including local maximums and local minimums in the waveform, and to detect samples corresponding to the detected extrema respectively; second means for deciding whether values of successive samples between samples corresponding to every two temporally adjacent extrema among the extrema detected by the first means are in an upward slope or a downward slope in the waveform; third means for detecting a number of successive samples between samples corresponding to every two temporally adjacent extrema among the extrema detected by the first means; fourth means for selecting one from coefficients in response to the sample number detected by the third means; fifth means for calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum; sixth means for calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum; seventh means for multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and eighth means for adding or subtracting the obtained multiplication result to or from a value of each of samples among the samples in the first, second, third, and fourth sample groups in response to a result of the deciding by the second means to generate harmonic components in the digital audio signal.

A seventh aspect of this invention is based on the sixth aspect thereof, and provides an apparatus wherein the fifth means calculates the first difference only and the sixth means calculates the fourth difference only, and the eighth means adds the obtained multiplication result to a value of each of the samples in the first sample group and subtracts the obtained multiplication result from a value of each of the samples in the fourth sample group to generate even-order harmonic components and odd-order harmonic components in the digital audio signal.

An eighth aspect of this invention is based on the sixth aspect thereof, and provides an apparatus wherein the fifth means calculates the second difference only and the sixth means calculates the third difference only, and the eighth means adds the obtained multiplication result to a value of each of the samples in the second sample group and subtracts the obtained multiplication result from a value of each of the samples in the third sample group to generate even-order harmonic components and odd-order harmonic components in the digital audio signal.

A ninth aspect of this invention is based on the sixth aspect thereof, and provides an apparatus wherein the fifth means calculates the first and second differences and the sixth means calculates the third and fourth differences, and the eighth means adds the obtained multiplication result to a value of each of the samples in the first and third sample groups and subtracts the obtained multiplication result from a value of each of the samples in the second and fourth sample groups to generate even-order harmonic components only in the digital audio signal.

A tenth aspect of this invention is based on the sixth aspect thereof, and provides an apparatus wherein the fifth means calculates the first and second differences and the sixth means calculates the third and fourth differences, and the eighth means adds the obtained multiplication result to a value of each of the samples in the second and fourth sample groups and subtracts the obtained multiplication result from a value of each of the samples in the first and third sample groups to generate even-order harmonic components only in the digital audio signal.

An eleventh aspect of this invention provides an apparatus for processing a digital audio signal having a sequence of samples having values representative of a waveform. The apparatus comprises first means for detecting samples corresponding to local maximums and minimums in the waveform; second means for increasing a value of a first specified sample immediately following each maximum-corresponding sample detected by the first means to correct the first specified sample; third means for decreasing a value of a second specified sample immediately preceding each minimum-corresponding sample detected by the first means to correct the second specified sample; and fourth means for holding samples, which are in a time interval from each minimum-corresponding sample detected by the first means to an immediately-following maximum-corresponding sample detected by the first means, as they are.

A twelfth aspect of this invention provides an apparatus for processing a digital audio signal having a sequence of samples having values representative of a waveform. The apparatus comprises first means for detecting samples corresponding to local maximums and minimums in the waveform; second means for decreasing a value of a first specified sample immediately following each minimum-corresponding sample detected by the first means to correct the first specified sample; third means for increasing a value of a second specified sample immediately preceding each maximum-corresponding sample detected by the first means to correct the second specified sample; and fourth means for holding samples, which are in a time interval from each maximum-corresponding sample detected by the first means to an immediately-following minimum-corresponding sample detected by the first means, as they are.

A thirteenth aspect of this invention provides an apparatus for processing a digital audio signal having a sequence of samples having values representative of a waveform. The apparatus comprises first means for detecting samples corresponding to local maximums and minimums in the waveform; second means for increasing a value of a first specified sample immediately following each minimum-corresponding sample detected by the first means to correct the first specified sample; third means for decreasing a value of a second specified sample immediately preceding each maximum-corresponding sample-detected by the first means to correct the second specified sample; fourth means for increasing a value of a third specified sample immediately following each maximum-corresponding sample detected by the first means to correct the third specified sample; and fifth means for decreasing a value of a fourth specified sample immediately preceding each minimum-corresponding sample detected by the first means.

A fourteenth aspect of this invention provides an apparatus for processing a digital audio signal having a sequence of samples having values representative of a waveform. The apparatus comprises first means for detecting samples corresponding to local maximums and minimums in the waveform; second means for decreasing a value of a first specified sample immediately following each minimum-corresponding sample detected by the first means to correct the first specified sample; third means for increasing a value of a second specified sample immediately preceding each maximum-corresponding sample detected by the first means to correct the second specified sample; fourth means for decreasing a value of a third specified sample immediately following each maximum-corresponding sample detected by the first means to correct the third specified sample; and fifth means for increasing a value of a fourth specified sample immediately preceding each minimum-corresponding sample detected by the first means.

This invention has the following advantage. A digital audio signal is formed by a sequence of samples having values representative of a waveform. The values of samples temporally adjacent to local maximums and minimums in the waveform are corrected to produce even-order harmonics only or even-order and odd-order harmonics. The produced harmonics enhance the quality of audio contents represented by the digital audio signal.

DETAILED DESCRIPTION OF THE INVENTION

First Embodiment

Figure 1:
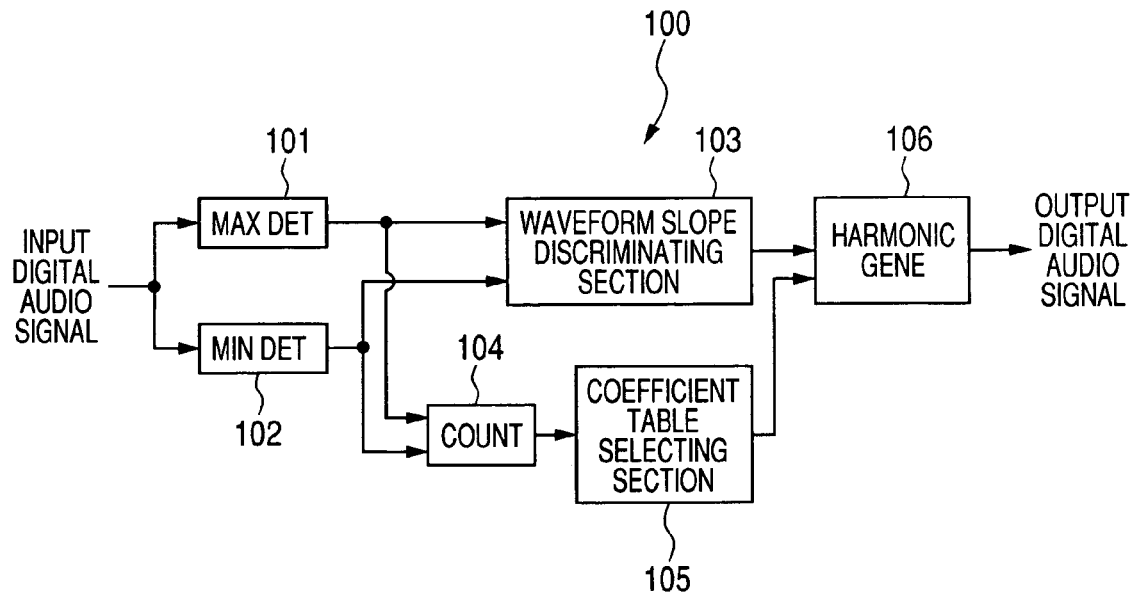
FIG. 1 is a block diagram of a digital audio signal processing apparatus according to a first embodiment of this invention.

FIG. 1 shows a digital audio signal processing apparatus 100 according to a first embodiment of this invention. The apparatus 100 includes a maximum detecting section 101, a minimum detecting section 102, a waveform slope discriminating section 103, a counter 104, a coefficient table selecting section 105, and a harmonic generating circuit 106.

The maximum detecting section 101 and the minimum detecting section 102 receive an input digital audio signal formed by a sequence of samples having values representing a waveform of an original analog audio signal from which the input digital audio signal is generated through analog-to-digital conversion at a prescribed sampling frequency. Each of the samples has a predetermined number of bits. The maximum detecting section 101 and the minimum detecting section 102 detect extrema consisting of local maximums and minimums in the waveform represented by the input digital audio signal. Specifically, the maximum detecting section 101 detects every local maximum in the waveform represented by the input digital audio signal, and a sample corresponding to the detected local maximum. The minimum detecting section 102 detects every local minimum in the waveform represented by the input digital audio signal, and a sample corresponding to the detected local minimum. The maximum detecting section 101 and the minimum detecting section 102 inform the waveform slope discriminating section 103 and the counter 104 of every detected local maximum, a sample corresponding to the detected local maximum, every detected local minimum, and a sample corresponding to the detected local minimum.

The waveform slope discriminating section 103 discriminates the slope of a partial waveform between every detected local maximum and an immediately-following detected local minimum and the slope of a partial waveform between every detected local minimum and an immediately-following detected local maximum. The waveform slope discriminating section 103 notifies the result of the slope discrimination to the harmonic generating circuit 106.

The counter 104 detects the number of samples between every sample corresponding to a detected local maximum and a sample corresponding to an immediately-following detected local minimum, and the number of samples between every sample corresponding to a detected local minimum and a sample corresponding to an immediately-following detected local maximum. The counter 104 notifies the detected sample number (referred to as the detected inter-extremum sample number) to the coefficient table selecting section 105.

The coefficient table selecting section 105 includes a memory storing data representing a table of coefficients assigned to different inter-extremum sample numbers. The coefficient table selecting section 105 selects, from the coefficients in the table, one assigned to an inter-extremum sample number equal to the detected sample number notified by the counter 104. The coefficient table selecting section 105 notifies the selected coefficient to the harmonic generating circuit 106.

The harmonic generating circuit 106 produces a digital signal representative of harmonics in response to the slope discrimination result notified by the waveform slope discriminating section 103 and the selected coefficient notified by the coefficient table selecting section 105. The input digital audio signal propagates to the harmonic generating circuit 106 through the maximum detecting section 101, the minimum detecting section 102, and the waveform slope discriminating section 103. The harmonic generating circuit 106 adds the produced digital harmonic signal to the input digital audio signal to generate an output digital audio signal. Specifically, the harmonic generating circuit 106 corrects specified ones among samples of the input digital audio signal in response to the slope discrimination result and the selected coefficient while maintaining the other samples as they are. The corrected samples and the non-corrected samples constitute the output digital audio signal. The harmonic generating circuit 106 feeds the output digital audio signal to an apparatus output terminal or an external device (not shown).

Figure 2:
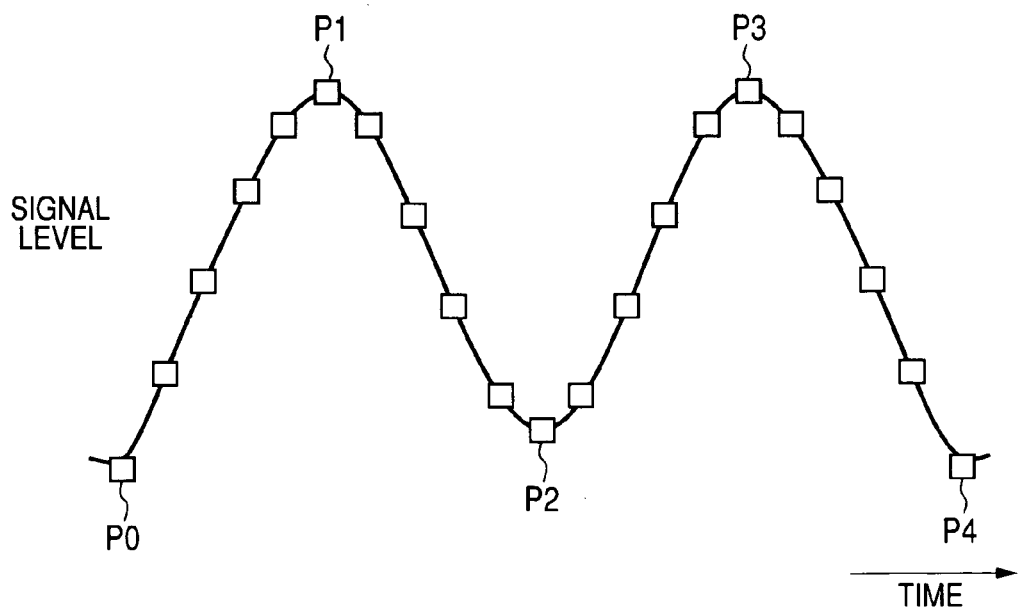
FIG. 2 is a time-domain diagram showing a waveform of an original analog audio signal, and samples of a digital audio signal generated by analog-to-digital conversion of the original analog audio signal.

With reference to FIG. 2, the solid line denotes the waveform of an original analog audio signal. The original analog audio signal is periodically sampled at a prescribed sampling frequency to generate an analog sample. Every analog sample is converted into a digital sample having a prescribed number of bits. The resultant digital samples are in a sequence forming the input digital audio signal. Samples of the input digital audio signal are spaced at time intervals equal to the reciprocal of the prescribed sampling frequency. In FIG. 2, the small squares denote samples of the input digital audio signal and the values of the samples also. In the case where every sample of the input digital audio signal has 16 bits (that is, a quantization bit number is equal to 16), the lowest value of the sample is −32768 while the highest value thereof is 32767.

With reference back to FIG. 1, the maximum detecting section 101 sequentially receives samples of the input digital audio signal and performs the following operation steps on a sample-by-sample basis. The maximum detecting section 101 subtracts the value of a second immediately preceding sample with respect to the current sample from the value of a first immediately preceding sample with respect to the current sample to get a first subtraction result. The maximum detecting section 101 subtracts the value of the first immediately preceding sample from the value of the current sample to get a second subtraction result. The maximum detecting section 101 decides whether or not the first subtraction result is positive and the second subtraction result is negative. When it is decided that the first subtraction result is positive and the second subtraction result is negative, the maximum detecting section 101 labels the value of the first immediately preceding sample as a local maximum and recognizes the first immediately preceding sample as a sample corresponding to the local maximum. In this way, the maximum detecting section 101 compares the values of the current sample and the first and second immediately preceding samples with respect to the current sample to implement the detection of a maximum-corresponding sample.

The minimum detecting section 102 sequentially receives samples of the input digital audio signal and performs the following operation steps on a sample-by-sample basis. The minimum detecting section 102 subtracts the value of the second immediately preceding sample with respect to the current sample from the value of the first immediately preceding sample with respect to the current sample to get a first subtraction result. The minimum detecting section 102 subtracts the value of the first immediately preceding sample from the value of the current sample to get a second subtraction result. The minimum detecting section 102 decides whether or not the first subtraction result is negative and the second subtraction result is positive. When it is decided that the first subtraction result is negative and the second subtraction result is positive, the minimum detecting section 102 labels the value of the first immediately preceding sample as a local minimum and recognizes the first immediately preceding sample as a sample corresponding to the local minimum. In this way, the minimum detecting section 102 compares the values of the current sample and the first and second immediately preceding samples with respect to the current sample to implement the detection of a minimum-corresponding sample.

In FIG. 2, P1 and P3 denote samples corresponding to local maximums while P2 and P4 denote samples corresponding to local minimums.

The waveform slope discriminating section 103 in FIG. 1 decides whether the values of samples between two samples corresponding to every two temporally-adjacent extrema are in an upward slope or a downward slope as viewed along a time base. In the case where a detected local maximum is notified by the maximum detecting section 101 and thereafter a detected local minimum is notified by the minimum detecting section 102, the waveform slope discriminating section 103 decides that the values of samples between the maximum-corresponding sample and the minimum-corresponding sample are in a downward slope as viewed along a time base. On the other hand, in the case where a detected local minimum is notified by the minimum detecting section 102 and thereafter a detected local maximum is notified by the maximum detecting section 101, the waveform slope discriminating section 103 decides that the values of samples between the minimum-corresponding sample and the maximum-corresponding sample are in an upward slope as viewed along a time base.

The counter 104 detects the number of samples between every two temporally-adjacent extremum-corresponding samples. Specifically, the counter 104 detects the number of samples between every sample corresponding to a local maximum detected by the maximum detecting section 101 and a sample corresponding to an immediately-following local minimum detected by the minimum detecting section 102, and the number of samples between every sample corresponding to a local minimum detected by the minimum detecting section 102 and a sample corresponding to an immediately-following local maximum detected by the maximum detecting section 102. The sample numbers detected by the counter 104 are inter-extremum sample numbers. The detection of inter-extremum sample numbers by the counter 104 is implemented by, for example, counting pulses of a sample clock signal synchronized with the input digital audio signal during each of time intervals between the moments of detection of extremum-corresponding samples. The sample clock signal is generated by a conventional device.

As previously mentioned, the coefficient table selecting section 105 has a table of coefficients assigned to different inter-extremum sample numbers. The coefficient table selecting section 105 selects, from the coefficients in the table, one assigned to an inter-extremum sample number equal to the sample number detected by the counter 104. The coefficients in the table are predetermined so that the value of a sample temporally adjacent to an extremum-corresponding sample will be less corrected in accordance with an increase in the inter-extremum sample number. Basically, the result of dividing the difference in value between two successive samples near an extremum-corresponding sample by the selected coefficient indicates the amount of correction for the value of a sample.

The harmonic generating circuit 106 classifies samples of the input digital audio signal into groups. Specifically, the harmonic generating circuit 106 places a sample or a prescribed number of samples adjacently preceding every maximum-corresponding sample in a first group. The harmonic generating circuit 106 places a sample or a prescribed number of samples adjacently following every maximum-corresponding sample in a second group. The harmonic generating circuit 106 places a sample or a prescribed number of samples adjacently preceding every minimum-corresponding sample in a third group. The harmonic generating circuit 106 places a sample or a prescribed number of samples adjacently following every minimum-corresponding sample in a fourth group.

The harmonic generating circuit 106 calculates the difference (referred to as the first difference) in value between each sample in the first group and the immediately following sample. The harmonic generating circuit 106 calculates the difference (referred to as the second difference) in value between each sample in the second group and the immediately preceding sample. It should be noted that the harmonic generating circuit 106 may calculate at least one of the first and second differences. The harmonic generating circuit 106 calculates the difference (referred to as the third difference) in value between each sample in the third group and the immediately following sample. The harmonic generating circuit 106 calculates the difference (referred to as the fourth difference) in value between each sample in the fourth group and the immediately preceding sample. It should be noted that the harmonic generating circuit 106 may calculate at least one of the third and fourth differences.

The harmonic generating circuit 106 multiplies the coefficient selected by the coefficient table selecting section 105 and the calculated difference to generate a multiplication result. The harmonic generating circuit 106 adds or subtracts the generated multiplication result to or from the value of every corresponding sample of the input digital audio signal depending on the result of the slope discrimination by the waveform slope discriminating section 103. This addition or subtraction causes harmonic components to be added to the input digital audio signal.

Thus, the harmonic generating circuit 106 receives, from the waveform slope discriminating section 103, information about the slope of a partial waveform between two temporally-adjacent extrema. In addition, the harmonic generating circuit 106 receives the selected coefficient from the coefficient table selecting section 105. The harmonic generating circuit 106 uses the waveform slope information and the selected coefficient in shaping the waveform represented by the input digital audio signal to produce harmonics and add the produced harmonics to the waveform. The shaping of the waveform is changed in response to the result of the slope discrimination by the waveform slope discriminating section 103 so that only even-order harmonics will be produced or even-order harmonics and odd-order harmonics will be produced. As a result of the shaping of the waveform by the harmonic generating circuit 106, the input digital audio signal is converted or corrected into the output digital audio signal.

The output digital audio signal is transmitted from the harmonic generating circuit 106 to the apparatus output terminal or the external device (not shown).

The harmonic generating circuit 106 is one selected from first, second, third, fourth, fifth, sixth, seventh, and eighth examples described below.

The operation and structure of the first example of the harmonic generating circuit 106 are as follows. The harmonic generating circuit 106 is designed to shape the waveform in such a manner as to produce even-order harmonics and odd-order harmonics. The harmonic generating circuit 106 receives a sequence of samples of the input digital audio signal. By referring to the discrimination result notified by the waveform slope discriminating section 103, the harmonic generating circuit 106 detects successive samples of the input digital audio signal which have values in an upward slope in the waveform, and successive samples of the input digital audio signal which have values in a downward slope in the waveform. The harmonic generating circuit 106 receives the information about every maximum-corresponding sample and every minimum-corresponding sample from the maximum detecting section 101 and the minimum detecting section 102 via the waveform discriminating section 103.

Figure 3:
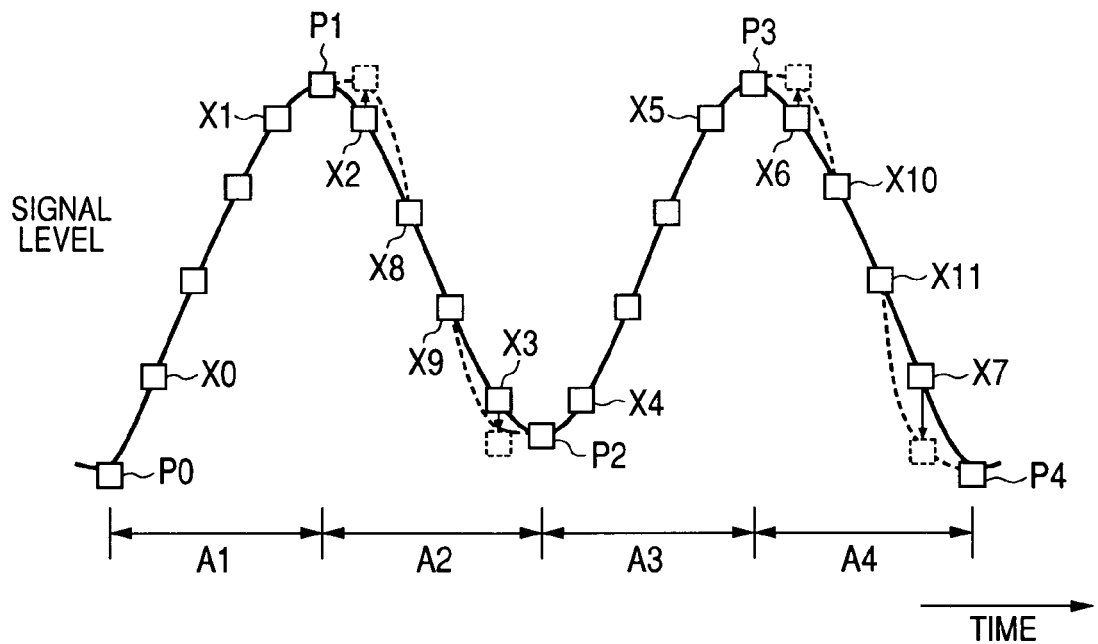
FIG. 3 is a time-domain diagram showing a waveform represented by an input digital audio signal, a waveform represented by an output digital audio signal, samples of the input digital audio signal, and samples of the output digital audio signal which occur in a first example of operation of the apparatus in FIG. 1.

With reference to FIG. 3, the harmonic generating circuit 106 subjects specified samples among successive samples having values in a downward slope to a waveform shaping process (a waveform correcting process), and does not perform the waveform shaping process with respect to all successive samples having values in an upward slope. Thus, the harmonic generating circuit 106 holds successive samples having values in an upward slope as they are.

The harmonic generating circuit 106 calculates the difference (referred to as the first difference) in value between a maximum-corresponding sample P1 and a sample X2 immediately following the maximum-corresponding sample P1. The harmonic generating circuit 106 receives, from the coefficient table selecting section 105, a selected coefficient for samples between the maximum-corresponding sample P1 and an immediately-following minimum-corresponding sample P2, that is, samples having values in a downward slope in the waveform. As previously mentioned, the selected coefficient depends on the number of samples between the maximum-corresponding sample P1 and the minimum-corresponding sample P2. In FIG. 3, A2 denotes a time interval corresponding to the number of samples between the maximum-corresponding sample P1 and the minimum-corresponding sample P2. The harmonic generating circuit 106 multiplies the absolute value of the calculated first difference by the received coefficient to get a multiplication-result value. Then, the harmonic generating circuit 106 adds the multiplication-result value to the original value of the sample X2 to get an addition-result value. Regarding the sample X2, the harmonic generating circuit 106 replaces the original value by the addition-result value to increase the sample value. In other words, the harmonic generating circuit 106 updates or corrects the sample X2 to the new value, that is, the addition-result value. The harmonic generating circuit 106 places the corrected sample X2 in the output digital audio signal. The correction of the value of the sample X2 is a part of the shaping of the waveform.

The harmonic generating circuit 106 calculates the difference (referred to as the second difference) in value between a maximum-corresponding sample P3 and a sample X6 immediately following the maximum-corresponding sample P3. The harmonic generating circuit 106 receives, from the coefficient table selecting section 105, a selected coefficient for samples between the maximum-corresponding sample P3 and an immediately-following minimum-corresponding sample P4, that is, samples having values in a downward slope in the waveform. As previously mentioned, the selected coefficient depends on the number of samples between the maximum-corresponding sample P3 and the minimum-corresponding sample P4. In FIG. 3, A4 denotes a time interval corresponding to the number of samples between the maximum-corresponding sample P3 and the minimum-corresponding sample P4. The harmonic generating circuit 106 multiplies the absolute value of the calculated second difference by the received coefficient to get a multiplication-result value. Then, the harmonic generating circuit 106 adds the multiplication-result value to the original value of the sample X6 to get an addition-result value. Regarding the sample X6, the harmonic generating circuit 106 replaces the original value by the addition-result value to increase the sample value. In other words, the harmonic generating circuit 106 updates or corrects the sample X6 to the new value, that is, the addition-result value. The harmonic generating circuit 106 places the corrected sample X6 in the output digital audio signal. The correction of the value of the sample X6 is a part of the shaping of the waveform.

The harmonic generating circuit 106 calculates the difference (referred to as the third difference) in value between the minimum-corresponding sample P2 and a sample X3 immediately preceding the minimum-corresponding sample P2. As previously mentioned, the harmonic generating circuit 106 receives, from the coefficient table selecting section 105, the selected coefficient for the samples between the maximum-corresponding sample P1 and the minimum-corresponding sample P2 which define the time interval A2 corresponding to the downward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X3 to get a subtraction-result value. Regarding the sample X3, the harmonic generating circuit 106 replaces the original value by the subtraction-result value to decrease the sample value. In other words, the harmonic generating circuit 106 updates or corrects the sample X3 to the new value, that is, the subtraction-result value. The harmonic generating circuit 106 places the corrected sample X3 in the output digital audio signal. The correction of the value of the sample X3 is a part of the shaping of the waveform.

The harmonic generating circuit 106 calculates the difference (referred to as the fourth difference) in value between the minimum-corresponding sample P4 and a sample X7 immediately preceding the minimum-corresponding sample P4. As previously mentioned, the harmonic generating circuit 106 receives, from the coefficient table selecting section 105, the selected coefficient for the samples between the maximum-corresponding sample P3 and the minimum-corresponding sample P4 which define the time interval A4 corresponding to the downward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X7 to get a subtraction-result value. Regarding the sample X7, the harmonic generating circuit 106 replaces the original value by the subtraction-result value to decrease the sample value. In other words, the harmonic generating circuit 106 updates or corrects the sample X7 to the new value, that is, the subtraction-result value. The harmonic generating circuit 106 places the corrected sample X7 in the output digital audio signal. The correction of the value of the sample X7 is a part of the shaping of the waveform.

The above-mentioned waveform-shaping operation of the harmonic generating circuit 106 converts or corrects the input digital audio signal into the output digital audio signal. In FIG. 3, the solid line denotes the waveform represented by the input digital audio signal while the dashed line denotes the waveform represented by the output digital audio signal. As shown in FIG. 3, the waveform represented by the output digital audio signal is closer to sawtooth one than the waveform represented by the input digital audio signal is. It is well-known in the art that even-order harmonics and odd-order harmonics increase as a related waveform is closer to sawtooth one. Accordingly, the harmonic generating circuit 106 generates even-order harmonics and odd-order harmonics through the shaping of the waveform. The harmonic generating circuit 106 adds the generated even-order and odd-order harmonics to the original waveform to generate the corrected waveform.

The operation and structure of the second example of the harmonic generating circuit 106 are as follows. The harmonic generating circuit 106 is designed to shape the waveform in such a manner as to produce even-order harmonics and odd-order harmonics. The harmonic generating circuit 106 receives a sequence of samples of the input digital audio signal. By referring to the discrimination result notified by the waveform slope discriminating section 103, the harmonic generating circuit 106 detects successive samples of the input digital audio signal which have values in an upward slope in the waveform, and successive samples of the input digital audio signal which have values in a downward slope in the waveform. The harmonic generating circuit 106 receives the information about every maximum-corresponding sample and every minimum-corresponding sample from the maximum detecting section 101 and the minimum detecting section 102 via the waveform discriminating section 103.

Figure 4:
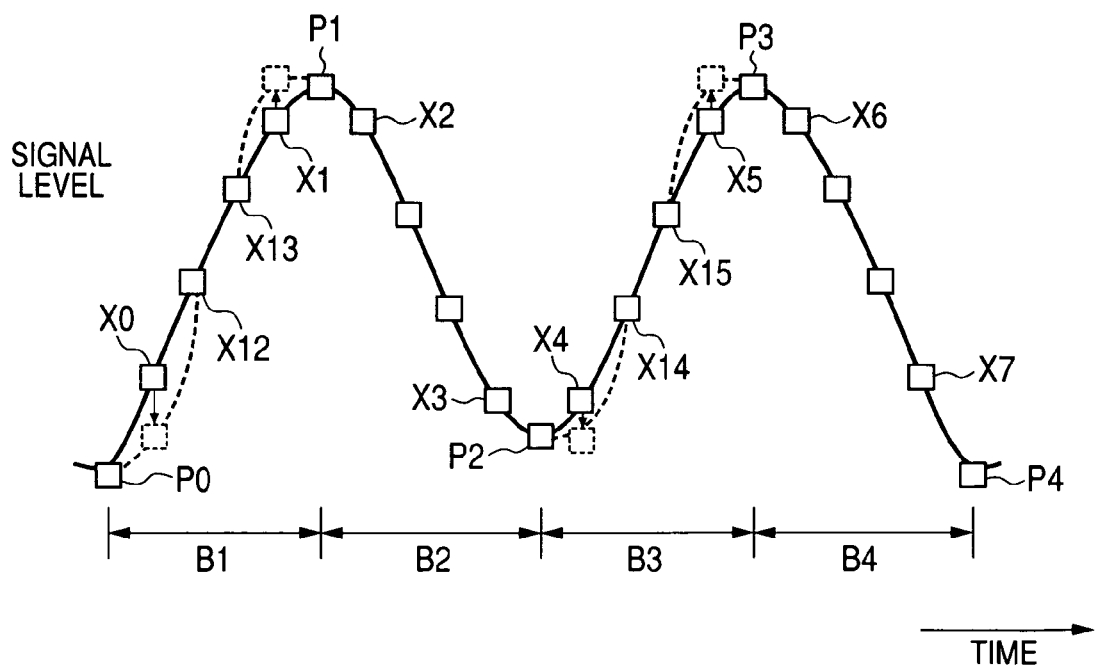
FIG. 4 is a time-domain diagram showing a waveform represented by an input digital audio signal, a waveform represented by an output digital audio signal, samples of the input digital audio signal, and samples of the output digital audio signal which occur in a second example of operation of the apparatus in FIG. 1.

With reference to FIG. 4, the harmonic generating circuit 106 subjects specified samples among successive samples having values in an upward slope to a waveform shaping process (a waveform correcting process), and does not perform the waveform shaping process with respect to all successive samples having values in a downward slope. Thus, the harmonic generating circuit 106 holds successive samples having values in a downward slope as they are.

The harmonic generating circuit 106 calculates the difference (referred to as the first difference) in value between a maximum-corresponding sample P1 and a sample X1 immediately preceding the maximum-corresponding sample P1. The harmonic generating circuit 106 receives, from the coefficient table selecting section 105, a selected coefficient for samples between the maximum-corresponding sample P1 and an immediately-preceding minimum-corresponding sample P0, that is, samples having values in an upward slope in the waveform. As previously mentioned, the selected coefficient depends on the number of samples between the minimum-corresponding sample P0 and the maximum-corresponding sample P1. In FIG. 4, B1 denotes a time interval corresponding to the number of samples between the minimum-corresponding sample P0 and the maximum-corresponding sample P1. The harmonic generating circuit 106 multiplies the absolute value of the calculated first difference by the received coefficient to get a multiplication-result value. Then, the harmonic generating circuit 106 adds the multiplication-result value to the original value of the sample X1 to get an addition-result value. Regarding the sample X1, the harmonic generating circuit 106 replaces the original value by the addition-result value to increase the sample value. In other words, the harmonic generating circuit 106 updates or corrects the sample X1 to the new value, that is, the addition-result value. The harmonic generating circuit 106 places the corrected sample X1 in the output digital audio signal. The correction of the value of the sample X1 is a part of the shaping of the waveform.

The harmonic generating circuit 106 calculates the difference (referred to as the second difference) in value between a maximum-corresponding sample P3 and a sample X5 immediately preceding the maximum-corresponding sample P3. The harmonic generating circuit 106 receives, from the coefficient table selecting section 105, a selected coefficient for samples between the maximum-corresponding sample P3 and an immediately-preceding minimum-corresponding sample P2, that is, samples having values in an upward slope in the waveform. As previously mentioned, the selected coefficient depends on the number of samples between the minimum-corresponding sample P2 and the maximum-corresponding sample P3. In FIG. 4, B3 denotes a time interval corresponding to the number of samples between the minimum-corresponding sample P2 and the maximum-corresponding sample P3. The harmonic generating circuit 106 multiplies the absolute value of the calculated second difference by the received coefficient to get a multiplication-result value. Then, the harmonic generating circuit 106 adds the multiplication-result value to the original value of the sample X5 to get an addition-result value. Regarding the sample X5, the harmonic generating circuit 106 replaces the original value by the addition-result value to increase the sample value. In other words, the harmonic generating circuit 106 updates or corrects the sample X5 to the new value, that is, the addition-result value. The harmonic generating circuit 106 places the corrected sample X5 in the output digital audio signal. The correction of the value of the sample X5 is a part of the shaping of the waveform.

The harmonic generating circuit 106 calculates the difference (referred to as the third difference) in value between the minimum-corresponding sample P0 and a sample X0 immediately following the minimum-corresponding sample P0. As previously mentioned, the harmonic generating circuit 106 receives, from the coefficient table selecting section 105, the selected coefficient for the samples between the minimum-corresponding sample P0 and the maximum-corresponding sample P1 which define the time interval B1 corresponding to the upward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X0 to get a subtraction-result value. Regarding the sample X0, the harmonic generating circuit 106 replaces the original value by the subtraction-result value to decrease the sample value. In other words, the harmonic generating circuit 106 updates or corrects the sample X0 to the new value, that is, the subtraction-result value. The harmonic generating circuit 106 places the corrected sample X0 in the output digital audio signal. The correction of the value of the sample X0 is a part of the shaping of the waveform.

The harmonic generating circuit 106 calculates the difference (referred to as the fourth difference) in value between the minimum-corresponding sample P2 and a sample X4 immediately following the minimum-corresponding sample P2. As previously mentioned, the harmonic generating circuit 106 receives, from the coefficient table selecting section 105, the selected coefficient for the samples between the minimum-corresponding sample P2 and the maximum-corresponding sample P3 which define the time interval B3 corresponding to the upward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X4 to get a subtraction-result value. Regarding the sample X4, the harmonic generating circuit 106 replaces the original value by the subtraction-result value to decrease the sample value. In other words, the harmonic generating circuit 106 updates or corrects the sample X4 to the new value, that is, the subtraction-result value. The harmonic generating circuit 106 places the corrected sample X4 in the output digital audio signal. The correction of the value of the sample X4 is a part of the shaping of the waveform.

The above-mentioned waveform-shaping operation of the harmonic generating circuit 106 converts or corrects the input digital audio signal into the output digital audio signal. In FIG. 4, the solid line denotes the waveform represented by the input digital audio signal while the dashed line denotes the waveform represented by the output digital audio signal. As shown in FIG. 4, the waveform represented by the output digital audio signal is closer to sawtooth one than the waveform represented by the input digital audio signal is. It is well-known in the art that even-order harmonics and odd-order harmonics increase as a related waveform is closer to sawtooth one. Accordingly, the harmonic generating circuit 106 generates even-order harmonics and odd-order harmonics through the shaping of the waveform. The harmonic generating circuit 106 adds the generated even-order and odd-order harmonics to the original waveform to generate the corrected waveform.

The third example of the harmonic generating circuit 106 is a modification of the first example thereof. The operation and structure of the third example of the harmonic generating circuit 106 are as follows. The harmonic generating circuit 106 subjects plural samples (for example, two samples) near every extremum-corresponding sample to a waveform shaping process, that is, a waveform correcting process to generate even-order harmonics and odd-order harmonics.

With reference to FIG. 3, the harmonic generating circuit 106 places samples X2 and X8, which immediately follow a maximum-corresponding sample P1, in a first group having members to be corrected. The harmonic generating circuit 106 calculates the difference (referred to as the first difference) in value between the maximum-corresponding sample P1 and the next sample X2. The harmonic generating circuit 106 calculates the difference (referred to as the second difference) in value between the sample X2 and the next sample X8. The harmonic generating circuit 106 receives, from the coefficient table selecting section 105, a selected coefficient for samples between the maximum-corresponding sample P1 and an immediately-following minimum-corresponding sample P2. The harmonic generating circuit 106 multiplies the absolute value of the calculated first difference by the received coefficient to get a first multiplication-result value. Then, the harmonic generating circuit 106 adds the first multiplication-result value to the original value of the sample X2 to get a first addition-result value. Regarding the sample X2, the harmonic generating circuit 106 replaces the original value by the first addition-result value to increase the sample value. In other words, the harmonic generating circuit 106 updates or corrects the sample X2 to the new value, that is, the first addition-result value. The harmonic generating circuit 106 multiplies the absolute value of the calculated second difference by the received coefficient to get a second multiplication-result value. Then, the harmonic generating circuit 106 adds the second multiplication-result value to the original value of the sample X8 to get a second addition-result value. Regarding the sample X8, the harmonic generating circuit 106 replaces the original value by the second addition-result value to increase the sample value. In other words, the harmonic generating circuit 106 updates or corrects the sample X8 to the new value, that is, the second addition-result value. The harmonic generating circuit 106 places the corrected samples X2 and X8 in the output digital audio signal. The correction of the values of the samples X2 and X8 is a part of the shaping of the waveform.

The harmonic generating circuit 106 places samples X6 and X10, which immediately follow a maximum-corresponding sample P3, in a second group having members to be corrected. The harmonic generating circuit 106 calculates the difference (referred to as the first difference) in value between the maximum-corresponding sample P3 and the next sample X6. The harmonic generating circuit 106 calculates the difference (referred to as the second difference) in value between the sample X6 and the next sample X10. The harmonic generating circuit 106 receives, from the coefficient table selecting section 105, a selected coefficient for samples between the maximum-corresponding sample P3 and an immediately-following minimum-corresponding sample P4. The harmonic generating circuit 106 multiplies the absolute value of the calculated first difference by the received coefficient to get a first multiplication-result value. Then, the harmonic generating circuit 106 adds the first multiplication-result value to the original value of the sample X6 to get a first addition-result value. Regarding the sample X6, the harmonic generating circuit 106 replaces the original value by the first addition-result value to increase the sample value. In other words, the harmonic generating circuit 106 updates or corrects the sample X6 to the new value, that is, the first addition-result value. The harmonic generating circuit 106 multiplies the absolute value of the calculated second difference by the received coefficient to get a second multiplication-result value. Then, the harmonic generating circuit 106 adds the second multiplication-result value to the original value of the sample X10 to get a second addition-result value. Regarding the sample X10, the harmonic generating circuit 106 replaces the original value by the second addition-result value to increase the sample value. In other words, the harmonic generating circuit 106 updates or corrects the sample X10 to the new value, that is, the second addition-result value. The harmonic generating circuit 106 places the corrected samples X6 and X10 in the output digital audio signal. The correction of the values of the samples X6 and X10 is a part of the shaping of the waveform.

The harmonic generating circuit 106 places samples X3 and X9, which immediately precede the minimum-corresponding sample P2, in a third group having members to be corrected. The harmonic generating circuit 106 calculates the difference (referred to as the first difference) in value between the minimum-corresponding sample P2 and the immediately preceding sample X3. The harmonic generating circuit 106 calculates the difference (referred to as the second difference) in value between the sample X3 and the immediately preceding sample X9. The harmonic generating circuit 106 receives, from the coefficient table selecting section 105, the selected coefficient for the samples between the maximum-corresponding sample P1 and the minimum-corresponding sample P2. The harmonic generating circuit 106 multiplies the absolute value of the calculated first difference by the received coefficient to get a first multiplication-result value. Then, the harmonic generating circuit 106 subtracts the first multiplication-result value from the original value of the sample X3 to get a first subtraction-result value. Regarding the sample X3, the harmonic generating circuit 106 replaces the original value by the first subtraction-result value to decrease the sample value. In other words, the harmonic generating circuit 106 updates or corrects the sample X3 to the new value, that is, the first subtraction-result value. The harmonic generating circuit 106 multiplies the absolute value of the calculated second difference by the received coefficient to get a second multiplication-result value. Then, the harmonic generating circuit 106 subtracts the second multiplication-result value from the original value of the sample X9 to get a second subtraction-result value. Regarding the sample X9, the harmonic generating circuit 106 replaces the original value by the second subtraction-result value to decrease the sample value. In other words, the harmonic generating circuit 106 updates or corrects the sample X9 to the new value, that is, the second subtraction-result value. The harmonic generating circuit 106 places the corrected samples X3 and X9 in the output digital audio signal. The correction of the values of the samples X3 and X9 is a part of the shaping of the waveform.

The harmonic generating circuit 106 places samples X7 and X11, which immediately precede the minimum-corresponding sample P4, in a fourth group having members to be corrected. The harmonic generating circuit 106 calculates the difference (referred to as the first difference) in value between the minimum-corresponding sample P4 and the immediately preceding sample X7. The harmonic generating circuit 106 calculates the difference (referred to as the second difference) in value between the sample X7 and the immediately preceding sample X11. The harmonic generating circuit 106 receives, from the coefficient table selecting section 105, the selected coefficient for the samples between the maximum-corresponding sample P3 and the minimum-corresponding sample P4. The harmonic generating circuit 106 multiplies the absolute value of the calculated first difference by the received coefficient to get a first multiplication-result value. Then, the harmonic generating circuit 106 subtracts the first multiplication-result value from the original value of the sample X7 to get a first subtraction-result value. Regarding the sample X7, the harmonic generating circuit 106 replaces the original value by the first subtraction-result value to decrease the sample value. In other words, the harmonic generating circuit 106 updates or corrects the sample X7 to the new value, that is, the first subtraction-result value. The harmonic generating circuit 106 multiplies the absolute value of the calculated second difference by the received coefficient to get a second multiplication-result value. Then, the harmonic generating circuit 106 subtracts the second multiplication-result value from the original value of the sample X11 to get a second subtraction-result value. Regarding the sample X11, the harmonic generating circuit 106 replaces the original value by the second subtraction-result value to decrease the sample value. In other words, the harmonic generating circuit 106 updates or corrects the sample X11 to the new value, that is, the second subtraction-result value. The harmonic generating circuit 106 places the corrected samples X7 and X11 in the output digital audio signal. The correction of the values of the samples X7 and X11 is a part of the shaping of the waveform.

The fourth example of the harmonic generating circuit 106 is a modification of the second example thereof. The operation and structure of the fourth example of the harmonic generating circuit 106 are as follows. The harmonic generating circuit 106 subjects plural samples (for example, two samples) near every extremum-corresponding sample to a waveform shaping process, that is, a waveform correcting process to generate even-order harmonics and odd-order harmonics.

With reference to FIG. 4, the harmonic generating circuit 106 places samples X0 and X12, which immediately follow a minimum-corresponding sample P0, in a first group having members to be corrected. The harmonic-generating circuit 106 calculates the difference (referred to as the first difference) in value between the minimum-corresponding sample P0 and the next sample X0. The harmonic generating circuit 106 calculates the difference (referred to as the second difference) in value between the sample X0 and the next sample X12. The harmonic generating circuit 106 receives, from the coefficient table selecting section 105, a selected coefficient for samples between the minimum-corresponding sample P0 and an immediately-following maximum-corresponding sample P1. The harmonic generating circuit 106 multiplies the absolute value of the calculated first difference by the received coefficient to get a first multiplication-result value. Then, the harmonic generating circuit 106 subtracts the first multiplication-result value from the original value of the sample X0 to get a first subtraction-result value. Regarding the sample X0, the harmonic generating circuit 106 replaces the original value by the first subtraction-result value to decrease the sample value. In other words, the harmonic generating circuit 106 updates or corrects the sample X0 to the new value, that is, the first subtraction-result value. The harmonic generating circuit 106 multiplies the absolute value of the calculated second difference by the received coefficient to get a second multiplication-result value. Then, the harmonic generating circuit 106 subtracts the second multiplication-result value from the original value of the sample X12 to get a second subtraction-result value. Regarding the sample X12, the harmonic generating circuit 106 replaces the original value by the second subtraction-result value to decrease the sample value. In other words, the harmonic generating circuit 106 updates or corrects the sample X12 to the new value, that is, the second subtraction-result value. The harmonic generating circuit 106 places the corrected samples X0 and X12 in the output digital audio signal. The correction of the values of the samples X0 and X12 is a part of the shaping of the waveform.

The harmonic generating circuit 106 places samples X4 and X14, which immediately follow a minimum-corresponding sample P2, in a second group having members to be corrected. The harmonic generating circuit 106 calculates the difference (referred to as the first difference) in value between the minimum-corresponding sample P2 and the next sample X4. The harmonic generating circuit 106 calculates the difference (referred to as the second difference) in value between the sample X4 and the next sample X14. The harmonic generating circuit 106 receives, from the coefficient table selecting section 105, a selected coefficient for samples between the minimum-corresponding sample P2 and an immediately-following maximum-corresponding sample P3. The harmonic generating circuit 106 multiplies the absolute value of the calculated first difference by the received coefficient to get a first multiplication-result value. Then, the harmonic generating circuit 106 subtracts the first multiplication-result value from the original value of the sample X4 to get a first subtraction-result value. Regarding the sample X4, the harmonic generating circuit 106 replaces the original value by the first subtraction-result value to decrease the sample value. In other words, the harmonic generating circuit 106 updates or corrects the sample X4 to the new value, that is, the first subtraction-result value. The harmonic generating circuit 106 multiplies the absolute value of the calculated second difference by the received coefficient to get a second multiplication-result value. Then, the harmonic generating circuit 106 subtracts the second multiplication-result value from the original value of the sample X14 to get a second subtraction-result value. Regarding the sample X14, the harmonic generating circuit 106 replaces the original value by the second subtraction-result value to decrease the sample value. In other words, the harmonic generating circuit 106 updates or corrects the sample X14 to the new value, that is, the second subtraction-result value. The harmonic generating circuit 106 places the corrected samples X4 and X14 in the output digital audio signal. The correction of the values of the samples X4 and X14 is a part of the shaping of the waveform.

The harmonic generating circuit 106 places samples X1 and X13, which immediately precede the maximum-corresponding sample P1, in a third group having members to be corrected. The harmonic generating circuit 106 calculates the difference (referred to as the first difference) in value between the maximum-corresponding sample P1 and the immediately preceding sample X1. The harmonic generating circuit 106 calculates the difference (referred to as the second difference) in value between the sample X1 and the immediately preceding sample X13. The harmonic generating circuit 106 receives, from the coefficient table selecting section 105, the selected coefficient for the samples between the minimum-corresponding sample P0 and the maximum-corresponding sample P1. The harmonic generating circuit 106 multiplies the absolute value of the calculated first difference by the received coefficient to get a first multiplication-result value. Then, the harmonic generating circuit 106 adds the first multiplication-result value to the original value of the sample X1 to get a first addition-result value. Regarding the sample X1, the harmonic generating circuit 106 replaces the original value by the first addition-result value to increase the sample value. In other words, the harmonic generating circuit 106 updates or corrects the sample X1 to the new value, that is, the first addition-result value. The harmonic generating circuit 106 multiplies the absolute value of the calculated second difference by the received coefficient to get a second multiplication-result value. Then, the harmonic generating circuit 106 adds the second multiplication-result value to the original value of the sample X13 to get a second addition-result value. Regarding the sample X13, the harmonic generating circuit 106 replaces the original value by the second addition-result value to increase the sample value. In other words, the harmonic generating circuit 106 updates or corrects the sample X13 to the new value, that is, the second addition-result value. The harmonic generating circuit 106 places the corrected samples X1 and X13 in the output digital audio signal. The correction of the values of the samples X1 and X13 is a part of the shaping of the waveform.

The harmonic generating circuit 106 places samples X5 and X15, which immediately precede the maximum-corresponding sample P3, in a fourth group having members to be corrected. The harmonic generating circuit 106 calculates the difference (referred to as the first difference) in value between the maximum-corresponding sample P3 and the immediately preceding sample X5. The harmonic generating circuit 106 calculates the difference (referred to as the second difference) in value between the sample X5 and the immediately preceding sample X15. The harmonic generating circuit 106 receives, from the coefficient table selecting section 105, the selected coefficient for the samples between the minimum-corresponding sample P2 and the maximum-corresponding sample P3. The harmonic generating circuit 106 multiplies the absolute value of the calculated first difference by the received coefficient to get a first multiplication-result value. Then, the harmonic generating circuit 106 adds the first multiplication-result value to the original value of the sample X5 to get a first addition-result value. Regarding the sample X5, the harmonic generating circuit 106 replaces the original value by the first addition-result value to increase the sample value. In other words, the harmonic generating circuit 106 updates or corrects the sample X5 to the new value, that is, the first addition-result value. The harmonic generating circuit 106 multiplies the absolute value of the calculated second difference by the received coefficient to get a second multiplication-result value. Then, the harmonic generating circuit 106 adds the second multiplication-result value to the original value of the sample X15 to get a second addition-result value. Regarding the sample X15, the harmonic generating circuit 106 replaces the original value by the second addition-result value to increase the sample value. In other words, the harmonic generating circuit 106 updates or corrects the sample X15 to the new value, that is, the second addition-result value. The harmonic generating circuit 106 places the corrected samples X5 and X15 in the output digital audio signal. The correction of the values of the samples X5 and X15 is a part of the shaping of the waveform.

The operation and structure of the fifth example of the harmonic generating circuit 106 are as follows. The harmonic generating circuit 106 is designed to shape the waveform in such a manner as to produce even-order harmonics only. The harmonic generating circuit 106 receives a sequence of samples of the input digital audio signal. By referring to the discrimination result notified by the waveform slope discriminating section 103, the harmonic generating circuit 106 detects successive samples of the input digital audio signal which have values in an upward slope in the waveform, and successive samples of the input digital audio signal which have values in a downward slope in the waveform. The harmonic generating circuit 106 receives the information about every maximum-corresponding sample and every minimum-corresponding sample from the maximum detecting section 101 and the minimum detecting section 102 via the waveform discriminating section 103.

Figure 5:
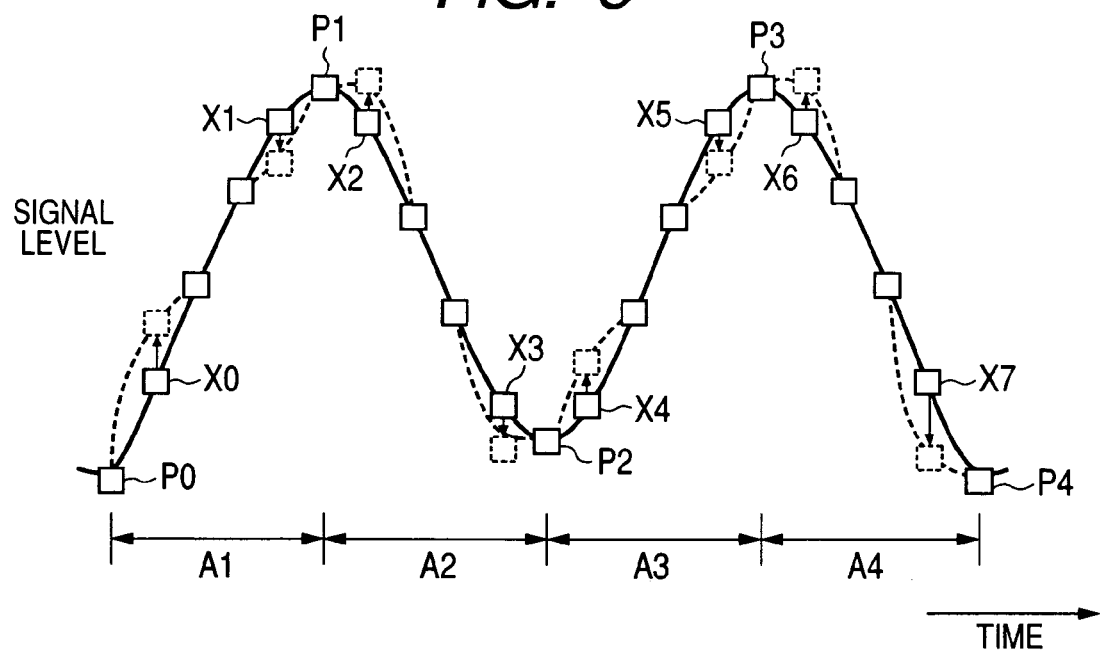
FIG. 5 is a time-domain diagram showing a waveform represented by an input digital audio signal, a waveform represented by an output digital audio signal, samples of the input digital audio signal, and samples of the output digital audio signal which occur in a third example of operation of the apparatus in FIG. 1.

With reference to FIG. 5, the harmonic generating circuit 106 subjects specified samples among successive samples having values in a downward slope to a waveform shaping process (a waveform correcting process), and also subjects specified samples among successive samples having values in an upward slope to the waveform shaping process in order to produce even-order harmonics only. Specifically, a sample near every maximum-corresponding sample and among successive samples having values in an upward slope is subjected to waveform correction designed to decrease the value of the sample. On the other hand, a sample near every minimum-corresponding sample and among successive samples having values in an upward slope is subjected to waveform correction designed to increase the value of the sample. A sample near every maximum-corresponding sample and among successive samples having values in a downward slope is subjected to waveform correction designed to increase the value of the sample. On the other hand, a sample near every minimum-corresponding sample and among successive samples having values in a downward slope is subjected to waveform correction designed to decrease the value of the sample.

In more detail, the harmonic generating circuit 106 calculates the difference (referred to as the first difference) in value between a maximum-corresponding sample P1 and a sample X1 immediately preceding the maximum-corresponding sample P1. The harmonic generating circuit 106 receives, from the coefficient table selecting section 105, a selected coefficient for samples between the maximum-corresponding sample P1 and an immediately-preceding minimum-corresponding sample P0, that is, samples having values in an upward slope in the waveform. As previously mentioned, the selected coefficient depends on the number of samples between the minimum-corresponding sample P0 and the maximum-corresponding sample P1. In FIG. 5, A1 denotes a time interval corresponding to the number of samples between the minimum-corresponding sample P0 and the maximum-corresponding sample P1. The harmonic generating circuit 106 multiplies the absolute value of the calculated first difference by the received coefficient to get a multiplication-result value. Then, the harmonic generating circuit 106 subtracts the multiplication-result value from the original value of the sample X1 to get a subtraction-result value. Regarding the sample X1, the harmonic generating circuit 106 replaces the original value by the subtraction-result value to decrease the sample value. In other words, the harmonic generating circuit 106 updates or corrects the sample X1 to the new value, that is, the subtraction-result value. The harmonic generating circuit 106 places the corrected sample X1 in the output digital audio signal. The correction of the value of the sample X1 is a part of the shaping of the waveform.

The harmonic generating circuit 106 calculates the difference (referred to as the second difference) in value between the maximum-corresponding sample P1 and a sample X2 immediately following the maximum-corresponding sample P1. The harmonic generating circuit 106 receives, from the coefficient table selecting section 105, a selected coefficient for samples between the maximum-corresponding sample P1 and an immediately-following minimum-corresponding sample P2, that is, samples having values in a downward slope in the waveform. As previously mentioned, the selected coefficient depends on the number of samples between the maximum-corresponding sample P1 and the minimum-corresponding sample P2. In FIG. 5, A2 denotes a time interval corresponding to the number of samples between the maximum-corresponding sample P1 and the minimum-corresponding sample P2. The harmonic generating circuit 106 multiplies the absolute value of the calculated second difference by the received coefficient to get a multiplication-result value. Then, the harmonic generating circuit 106 adds the multiplication-result value to the original value of the sample X2 to get an addition-result value. Regarding the sample X2, the harmonic generating circuit 106 replaces the original value by the addition-result value to increase the sample value. In other words, the harmonic generating circuit 106 updates or corrects the sample X2 to the new value, that is, the addition-result value. The harmonic generating circuit 106 places the corrected sample X2 in the output digital audio signal. The correction of the value of the sample X2 is a part of the shaping of the waveform.

The harmonic generating circuit 106 calculates the difference (referred to as the first difference) in value between a maximum-corresponding sample P3 and a sample X5 immediately preceding the maximum-corresponding sample P3. The harmonic generating circuit 106 receives, from the coefficient table selecting section 105, a selected coefficient for samples between the minimum-corresponding sample P2 and the maximum-corresponding sample P3, that is, samples having values in an upward slope in the waveform. As previously mentioned, the selected coefficient depends on the number of samples between the minimum-corresponding sample P2 and the maximum-corresponding sample P3. In FIG. 5, A3 denotes a time interval corresponding to the number of samples between the minimum-corresponding sample P2 and the maximum-corresponding sample P3. The harmonic generating circuit 106 multiplies the absolute value of the calculated first difference by the received coefficient to get a multiplication-result value. Then, the harmonic generating circuit 106 subtracts the multiplication-result value from the original value of the sample X5 to get a subtraction-result value. Regarding the sample X5, the harmonic generating circuit 106 replaces the original value by the subtraction-result value to decrease the sample value. In other words, the harmonic generating circuit 106 updates or corrects the sample X5 to the new value, that is, the subtraction-result value. The harmonic generating circuit 106 places the corrected sample X5 in the output digital audio signal. The correction of the value of the sample X5 is a part of the shaping of the waveform.

The harmonic generating circuit 106 calculates the difference (referred to as the second difference) in value between the maximum-corresponding sample P3 and a sample X6 immediately following the maximum-corresponding sample P3. The harmonic generating circuit 106 receives, from the coefficient table selecting section 105, a selected coefficient for samples between the maximum-corresponding sample P3 and an immediately-following minimum-corresponding sample P4, that is, samples having values in a downward slope in the waveform. As previously mentioned, the selected coefficient depends on the number of samples between the maximum-corresponding sample P3 and the minimum-corresponding sample P4. In FIG. 5, A4 denotes a time interval corresponding to the number of samples between the maximum-corresponding sample P3 and the minimum-corresponding sample P4. The harmonic generating circuit 106 multiplies the absolute value of the calculated second difference by the received coefficient to get a multiplication-result value. Then, the harmonic generating circuit 106 adds the multiplication-result value to the original value of the sample X6 to get an addition-result value. Regarding the sample X6, the harmonic generating circuit 106 replaces the original value by the addition-result value to increase the sample value. In other words, the harmonic generating circuit 106 updates or corrects the sample X6 to the new value, that is, the addition-result value. The harmonic generating circuit 106 places the corrected sample X6 in the output digital audio signal. The correction of the value of the sample X6 is a part of the shaping of the waveform.

The harmonic generating circuit 106 calculates the difference (referred to as the third difference) in value between the minimum-corresponding sample P0 and a sample X0 immediately following the minimum-corresponding sample P0. The harmonic generating circuit 106 receives, from the coefficient table selecting section 105, the selected coefficient for the samples between the minimum-corresponding sample P0 and the maximum-corresponding sample P1 which define the time interval A1 corresponding to the upward slope in the waveform. The harmonic generating circuit 106 multiplies the absolute value of the calculated third difference by the received coefficient to get a multiplication-result value. Then, the harmonic generating circuit 106 adds the multiplication-result value to the original value of the sample X0 to get an addition-result value. Regarding the sample X0, the harmonic generating circuit 106 replaces the original value by the addition-result value to increase the sample value. In other words, the harmonic generating circuit 106 updates or corrects the sample X0 to the new value, that is, the addition-result value. The harmonic generating circuit 106 places the corrected sample X0 in the output digital audio signal. The correction of the value of the sample X0 is a part of the shaping of the waveform.

The harmonic generating circuit 106 calculates the difference (referred to as the fourth difference) in value between the minimum-corresponding sample P2 and a sample X3 immediately preceding the minimum-corresponding sample P2. The harmonic generating circuit 106 receives, from the coefficient table selecting section 105, the selected coefficient for the samples between the maximum-corresponding sample P1 and the minimum-corresponding sample P2 which define the time interval A2 corresponding to the downward slope in the waveform. The harmonic generating circuit 106 multiplies the absolute value of the calculated fourth difference by the received coefficient to get a multiplication-result value. Then, the harmonic generating circuit 106 subtracts the multiplication-result value from the original value of the sample X3 to get a subtraction-result value. Regarding the sample X3, the harmonic generating circuit 106 replaces the original value by the subtraction-result value to decrease the sample value. In other words, the harmonic generating circuit 106 updates or corrects the sample X3 to the new value, that is, the subtraction-result value. The harmonic generating circuit 106 places the corrected sample X3 in the output digital audio signal. The correction of the value of the sample X3 is a part of the shaping of the waveform.

The harmonic generating circuit 106 calculates the difference (referred to as the third difference) in value between the minimum-corresponding sample P2 and a sample X4 immediately following the minimum-corresponding sample P2. The harmonic generating circuit 106 receives, from the coefficient table selecting section 105, the selected coefficient for the samples between the minimum-corresponding sample P2 and the maximum-corresponding sample P3 which define the time interval A3 corresponding to the upward slope in the waveform. The harmonic generating circuit 106 multiplies the absolute value of the calculated third difference by the received coefficient to get a multiplication-result value. Then, the harmonic generating circuit 106 adds the multiplication-result value to the original value of the sample X4 to get an addition-result value. Regarding the sample X4, the harmonic generating circuit 106 replaces the original value by the addition-result value to increase the sample value. In other words, the harmonic generating circuit 106 updates or corrects the sample X4 to the new value, that is, the addition-result value. The harmonic generating circuit 106 places the corrected sample X4 in the output digital audio signal. The correction of the value of the sample X4 is a part of the shaping of the waveform.

The harmonic generating circuit 106 calculates the difference (referred to as the fourth difference) in value between the minimum-corresponding sample P4 and a sample X7 immediately preceding the minimum-corresponding sample P4. The harmonic generating circuit 106 receives, from the coefficient table selecting section 105, the selected coefficient for the samples between the maximum-corresponding sample P3 and the minimum-corresponding sample P4 which define the time interval A4 corresponding to the downward slope in the waveform. The harmonic generating circuit 106 multiplies the absolute value of the calculated fourth difference by the received coefficient to get a multiplication-result value. Then, the harmonic generating circuit 106 subtracts the multiplication-result value from the original value of the sample X7 to get a subtraction-result value. Regarding the sample X7, the harmonic generating circuit 106 replaces the original value by the subtraction-result value to decrease the sample value. In other words, the harmonic generating circuit 106 updates or corrects the sample X7 to the new value, that is, the subtraction-result value. The harmonic generating circuit 106 places the corrected sample X7 in the output digital audio signal. The correction of the value of the sample X7 is a part of the shaping of the waveform.

The above-mentioned waveform-shaping operation of the harmonic generating circuit 106 converts or corrects the input digital audio signal into the output digital audio signal. In FIG. 5, the solid line denotes the waveform represented by the input digital audio signal while the dashed line denotes the waveform represented by the output digital audio signal. The waveform represented by the output digital audio signal is closer to a typical waveform resulting from the addition of even-order harmonics to an original waveform. Accordingly, the waveform shaping process by the harmonic generating circuit 106 generates even-order harmonics only. The harmonic generating circuit 106 adds the generated even-order harmonics to the original waveform to generate the corrected waveform.

The operation and structure of the sixth example of the harmonic generating circuit 106 are as follows. The harmonic generating circuit 106 is designed to shape the waveform in such a manner as to produce even-order harmonics only. The harmonic generating circuit 106 receives a sequence of samples of the input digital audio signal. By referring to the discrimination result notified by the waveform slope discriminating section 103, the harmonic generating circuit 106 detects successive samples of the input digital audio signal which have values in an upward slope in the waveform, and successive samples of the input digital audio signal which have values in a downward slope in the waveform. The harmonic generating circuit 106 receives the information about every maximum-corresponding sample and every minimum-corresponding sample from the maximum detecting section 101 and the minimum detecting section 102 via the waveform discriminating section 103.

Figure 6:
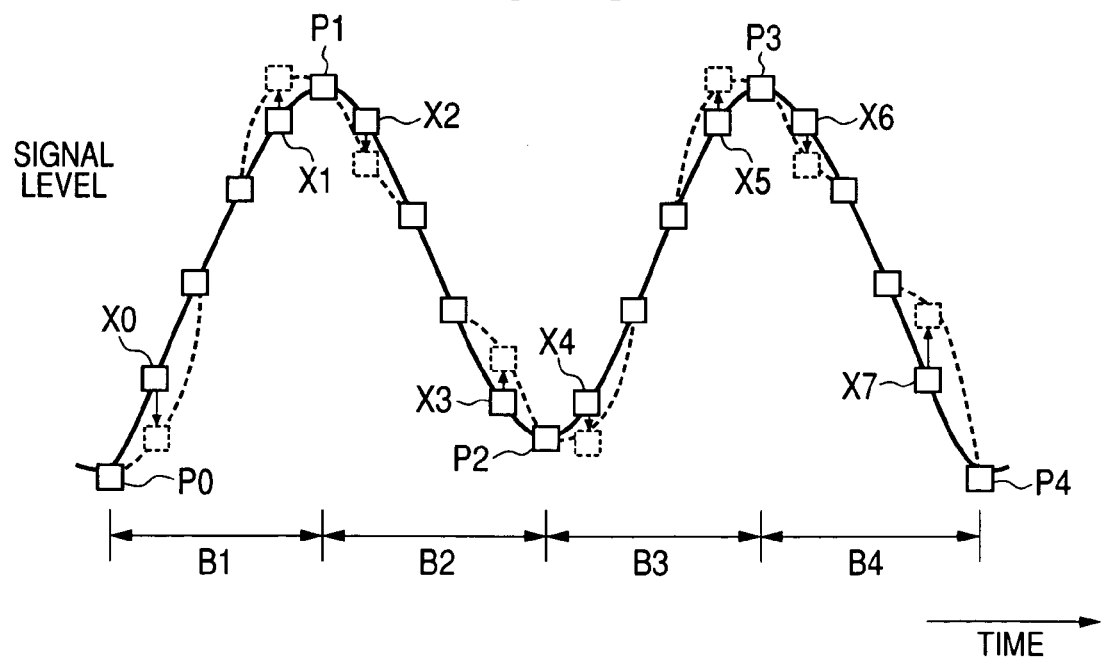
FIG. 6 is a time-domain diagram showing a waveform represented by an input digital audio signal, a waveform represented by an output digital audio signal, samples of the input digital audio signal, and samples of the output digital audio signal which occur in a fourth example of operation of the apparatus in FIG. 1.

With reference to FIG. 6, the harmonic generating circuit 106 subjects specified samples among successive samples having values in a downward slope to a waveform shaping process (a waveform correcting process), and also subjects specified samples among successive samples having values in an upward slope to the waveform shaping process in order to produce even-order harmonics. Specifically, a sample near every maximum-corresponding sample and among successive samples having values in an upward slope is subjected to waveform correction designed to increase the value of the sample. On the other hand, a sample near every minimum-corresponding sample and among successive samples having values in an upward slope is subjected to waveform correction designed to decrease the value of the sample. A sample near every maximum-corresponding sample and among successive samples having values in a downward slope is subjected to waveform correction designed to decrease the value of the sample. On the other hand, a sample near every minimum-corresponding sample and among successive samples having values in a downward slope is subjected to waveform correction designed to increase the value of the sample.

In more detail, the harmonic generating circuit 106 calculates the difference (referred to as the first difference) in value between a maximum-corresponding sample P1 and a sample X1 immediately preceding the maximum-corresponding sample P1. The harmonic generating circuit 106 receives, from the coefficient table selecting section 105, a selected coefficient for samples between the maximum-corresponding sample P1 and an immediately-preceding minimum-corresponding sample P0, that is, samples having values in an upward slope in the waveform. As previously mentioned, the selected coefficient depends on the number of samples between the minimum-corresponding sample P0 and the maximum-corresponding sample P1. In FIG. 6, B1 denotes a time interval corresponding to the number of samples between the minimum-corresponding sample P0 and the maximum-corresponding sample P1. The harmonic generating circuit 106 multiplies the absolute value of the calculated first difference by the received coefficient to get a multiplication-result value. Then, the harmonic generating circuit 106 adds the multiplication-result value to the original value of the sample X1 to get an addition-result value. Regarding the sample X1, the harmonic generating circuit 106 replaces the original value by the addition-result value to increase the sample value. In other words, the harmonic generating circuit 106 updates or corrects the sample X1 to the new value, that is, the addition-result value. The harmonic generating circuit 106 places the corrected sample X1 in the output digital audio signal. The correction of the value of the sample X1 is a part of the shaping of the waveform.

The harmonic generating circuit 106 calculates the difference (referred to as the second difference) in value between the maximum-corresponding sample P1 and a sample X2 immediately following the maximum-corresponding sample P1. The harmonic generating circuit 106 receives, from the coefficient table selecting section 105, a selected coefficient for samples between the maximum-corresponding sample P1 and an immediately-following minimum-corresponding sample P2, that is, samples having values in a downward slope in the waveform. As previously mentioned, the selected coefficient depends on the number of samples between the maximum-corresponding sample P1 and the minimum-corresponding sample P2. In FIG. 6, B2 denotes a time interval corresponding to the number of samples between the maximum-corresponding sample P1 and the minimum-corresponding sample P2. The harmonic generating circuit 106 multiplies the absolute value of the calculated second difference by the received coefficient to get a multiplication-result value. Then, the harmonic generating circuit 106 subtracts the multiplication-result value from the original value of the sample X2 to get a subtraction-result value. Regarding the sample X2, the harmonic generating circuit 106 replaces the original value by the subtraction-result value to decrease the sample value. In other words, the harmonic generating circuit 106 updates or corrects the sample X2 to the new value, that is, the subtraction-result value. The harmonic generating circuit 106 places the corrected sample X2 in the output digital audio signal. The correction of the value of the sample X2 is a part of the shaping of the waveform.

The harmonic generating circuit 106 calculates the difference (referred to as the first difference) in value between a maximum-corresponding sample P3 and a sample X5 immediately preceding the maximum-corresponding sample P3. The harmonic generating circuit 106 receives, from the coefficient table selecting section 105, a selected coefficient for samples between the minimum-corresponding sample P2 and the maximum-corresponding sample P3, that is, samples having values in an upward slope in the waveform. As previously mentioned, the selected coefficient depends on the number of samples between the minimum-corresponding sample P2 and the maximum-corresponding sample P3. In FIG. 6, B3 denotes a time interval corresponding to the number of samples between the minimum-corresponding sample P2 and the maximum-corresponding sample P3. The harmonic generating circuit 106 multiplies the absolute value of the calculated first difference by the received coefficient to get a multiplication-result value. Then, the harmonic generating circuit 106 adds the multiplication-result value to the original value of the sample X5 to get an addition-result value. Regarding the sample X5, the harmonic generating circuit 106 replaces the original value by the addition-result value to increase the sample value. In other words, the harmonic generating circuit 106 updates or corrects the sample X5 to the new value, that is, the addition-result value. The harmonic generating circuit 106 places the corrected sample X5 in the output digital audio signal. The correction of the value of the sample X5 is a part of the shaping of the waveform.

The harmonic generating circuit 106 calculates the difference (referred to as the second difference) in value between the maximum-corresponding sample P3 and a sample X6 immediately following the maximum-corresponding sample P3. The harmonic generating circuit 106 receives, from the coefficient table selecting section 105, a selected coefficient for samples between the maximum-corresponding sample P3 and an immediately-following minimum-corresponding sample P4, that is, samples having values in a downward slope in the waveform. As previously mentioned, the selected coefficient depends on the number of samples between the maximum-corresponding sample P3 and the minimum-corresponding sample P4. In FIG. 6, B4 denotes a time interval corresponding to the number of samples between the maximum-corresponding sample P3 and the minimum-corresponding sample P4. The harmonic generating circuit 106 multiplies the absolute value of the calculated second difference by the received coefficient to get a multiplication-result value. Then, the harmonic generating circuit 106 subtracts the multiplication-result value from the original value of the sample X6 to get a subtraction-result value. Regarding the sample X6, the harmonic generating circuit 106 replaces the original value by the subtraction-result value to decrease the sample value. In other words, the harmonic generating circuit 106 updates or corrects the sample X6 to the new value, that is, the subtraction-result value. The harmonic generating circuit 106 places the corrected sample X6 in the output digital audio signal. The correction of the value of the sample X6 is a part of the shaping of the waveform.

The harmonic generating circuit 106 calculates the difference (referred to as the third difference) in value between the minimum-corresponding sample P0 and a sample X0 immediately following the minimum-corresponding sample P0. The harmonic generating circuit 106 receives, from the coefficient table selecting section 105, the selected coefficient for the samples between the minimum-corresponding sample P0 and the maximum-corresponding sample P1 which define the time interval B1 corresponding to the upward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X0 to get a subtraction-result value. Regarding the sample X0, the harmonic generating circuit 106 replaces the original value by the subtraction-result value to decrease the sample value. In other words, the harmonic generating circuit 106 updates or corrects the sample X0 to the new value, that is, the subtraction-result value. The harmonic generating circuit 106 places the corrected sample X0 in the output digital audio signal. The correction of the value of the sample X0 is a part of the shaping of the waveform.

The harmonic generating circuit 106 calculates the difference (referred to as the fourth difference) in value between the minimum-corresponding sample P2 and a sample X3 immediately preceding the minimum-corresponding sample P2. The harmonic generating circuit 106 receives, from the coefficient table selecting section 105, the selected coefficient for the samples between the maximum-corresponding sample P1 and the minimum-corresponding sample P2 which define the time interval B2 corresponding to the downward slope in the waveform. The harmonic generating circuit 106 multiplies the absolute value of the calculated fourth difference by the received coefficient to get a multiplication-result value. Then, the harmonic generating circuit 106 adds the multiplication-result value to the original value of the sample X3 to get an addition-result value. Regarding the sample X3, the harmonic generating circuit 106 replaces the original value by the addition-result value to increase the sample value. In other words, the harmonic generating circuit 106 updates or corrects the sample X3 to the new value, that is, the addition-result value. The harmonic generating circuit 106 places the corrected sample X3 in the output digital audio signal. The correction of the value of the sample X3 is a part of the shaping of the waveform.

The harmonic generating circuit 106 calculates the difference (referred to as the third difference) in value between the minimum-corresponding sample P2 and a sample X4 immediately following the minimum-corresponding sample P2. The harmonic generating circuit 106 receives, from the coefficient table selecting section 105, the selected coefficient for the samples between the minimum-corresponding sample P2 and the maximum-corresponding sample P3 which define the time interval B3 corresponding to the upward slope in the waveform. The harmonic generating circuit 106 multiplies the absolute value of the calculated third difference by the received coefficient to get a multiplication-result value. Then, the harmonic generating circuit 106 subtracts the multiplication-result value from the original value of the sample X4 to get a subtraction-result value. Regarding the sample X4, the harmonic generating circuit 106 replaces the original value by the subtraction-result value to decrease the sample value. In other words, the harmonic generating circuit 106 updates or corrects the sample X4 to the new value, that is, the subtraction-result value. The harmonic generating circuit 106 places the corrected sample X4 in the output digital audio signal. The correction of the value of the sample X4 is a part of the shaping of the waveform.

The harmonic generating circuit 106 calculates the difference (referred to as the fourth difference) in value between the minimum-corresponding sample P4 and a sample X7 immediately preceding the minimum-corresponding sample P4. The harmonic generating circuit 106 receives, from the coefficient table selecting section 105, the selected coefficient for the samples between the maximum-corresponding sample P3 and the minimum-corresponding sample P4 which define the time interval B4 corresponding to the downward slope in the waveform. The harmonic generating circuit 106 multiplies the absolute value of the calculated fourth difference by the received coefficient to get a multiplication-result value. Then, the harmonic generating circuit 106 adds the multiplication-result value to the original value of the sample X7 to get an addition-result value. Regarding the sample X7, the harmonic generating circuit 106 replaces the original value by the addition-result value to increase the sample value. In other words, the harmonic generating circuit 106 updates or corrects the sample X7 to the new value, that is, the addition-result value. The harmonic generating circuit 106 places the corrected sample X7 in the output digital audio signal. The correction of the value of the sample X7 is a part of the shaping of the waveform.

The above-mentioned waveform-shaping operation of the harmonic generating circuit 106 converts or corrects the input digital audio signal into the output digital audio signal. In FIG. 6, the solid line denotes the waveform represented by the input digital audio signal while the dashed line denotes the waveform represented by the output digital audio signal. The waveform represented by the output digital audio signal is closer to a typical waveform resulting from the addition of even-order harmonics to an original waveform. Accordingly, the waveform shaping process by the harmonic generating circuit 106 generates even-order harmonics only. The harmonic generating circuit 106 adds the generated even-order harmonics to the original waveform to generate the corrected waveform.

The seventh example of the harmonic generating circuit 106 is a modification of the fifth example thereof (see FIG. 5). The operation and structure of the seventh example of the harmonic generating circuit 106 are as follows. The harmonic generating circuit 106 subjects plural samples (for example, two samples) immediately preceding every extremum-corresponding sample and plural samples (for example, two samples) immediately following the extremum-corresponding sample to a waveform shaping process, that is, a waveform correcting process to generate even-order harmonics.

The harmonic generating circuit 106 places a prescribed number of successive samples, which immediately precede every maximum-corresponding sample, in a first group. The harmonic generating circuit 106 calculates the difference in value between each sample in the first group and the immediately following sample. For each sample in the first group, the harmonic generating circuit 106 multiplies the absolute value of the calculated difference by the corresponding selected coefficient to get a multiplication-result value. Then, the harmonic generating circuit 106 subtracts the multiplication-result value from the original value of the corresponding sample to get a subtraction-result value. Regarding each sample in the first group, the harmonic generating circuit 106 replaces the original value by the subtraction-result value to decrease the sample value.

The harmonic generating circuit 106 places a prescribed number of successive samples, which immediately follow every maximum-corresponding sample, in a second group. The harmonic generating circuit 106 calculates the difference in value between each sample in the second group and the immediately preceding sample. For each sample in the second group, the harmonic generating circuit 106 multiplies the absolute value of the calculated difference by the corresponding selected coefficient to get a multiplication-result value. Then, the harmonic generating circuit 106 adds the multiplication-result value to the original value of the corresponding sample to get an addition-result value. Regarding each sample in the second group, the harmonic generating circuit 106 replaces the original value by the addition-result value to increase the sample value.

The harmonic generating circuit 106 places a prescribed number of successive samples, which immediately precede every minimum-corresponding sample, in a third group. The harmonic generating circuit 106 calculates the difference in value between each sample in the third group and the immediately following sample. For each sample in the third group, the harmonic generating circuit 106 multiplies the absolute value of the calculated difference by the corresponding selected coefficient to get a multiplication-result value. Then, the harmonic generating circuit 106 subtracts the multiplication-result value from the original value of the corresponding sample to get a subtraction-result value. Regarding each sample in the third group, the harmonic generating circuit 106 replaces the original value by the subtraction-result value to decrease the sample value.

The harmonic generating circuit 106 places a prescribed number of successive samples, which immediately follow every minimum-corresponding sample, in a fourth group. The harmonic generating circuit 106 calculates the difference in value between each sample in the fourth group and the immediately preceding sample. For each sample in the fourth group, the harmonic generating circuit 106 multiplies the absolute value of the calculated difference by the corresponding selected coefficient to get a multiplication-result value.

Then, the harmonic generating circuit 106 adds the multiplication-result value to the original value of the corresponding sample to get an addition-result value. Regarding each sample in the fourth group, the harmonic generating circuit 106 replaces the original value by the addition-result value to increase the sample value.

The eighth example of the harmonic generating circuit 106 is a modification of the sixth example thereof (see FIG. 6). The operation and structure of the eighth example of the harmonic generating circuit 106 are as follows. The harmonic generating circuit 106 subjects plural samples (for example, two samples) immediately preceding every extremum-corresponding sample and plural samples (for example, two samples) immediately following the extremum-corresponding sample to a waveform shaping process, that is, a waveform correcting process to generate even-order harmonics.

The harmonic generating circuit 106 places a prescribed number of successive samples, which immediately precede every maximum-corresponding sample, in a first group. The harmonic generating circuit 106 calculates the difference in value between each sample in the first group and the immediately following sample. For each sample in the first group, the harmonic generating circuit 106 multiplies the absolute value of the calculated difference by the corresponding selected coefficient to get a multiplication-result value. Then, the harmonic generating circuit 106 adds the multiplication-result value to the original value of the corresponding sample to get an addition-result value. Regarding each sample in the first group, the harmonic generating circuit 106 replaces the original value by the addition-result value to increase the sample value.

The harmonic generating circuit 106 places a prescribed number of successive samples, which immediately follow every maximum-corresponding sample, in a second group. The harmonic generating circuit 106 calculates the difference in value between each sample in the second group and the immediately preceding sample. For each sample in the second group, the harmonic generating circuit 106 multiplies the absolute value of the calculated difference by the corresponding selected coefficient to get a multiplication-result value. Then, the harmonic generating circuit 106 subtracts the multiplication-result value from the original value of the corresponding sample to get a subtraction-result value. Regarding each sample in the second group, the harmonic generating circuit 106 replaces the original value by the subtraction-result value to decrease the sample value.

The harmonic generating circuit 106 places a prescribed number of successive samples, which immediately precede every minimum-corresponding sample, in a third group. The harmonic generating circuit 106 calculates the difference in value between each sample in the third group and the immediately following sample. For each sample in the third group, the harmonic generating circuit 106 multiplies the absolute value of the calculated difference by the corresponding selected coefficient to get a multiplication-result value. Then, the harmonic generating circuit 106 adds the multiplication-result value to the original value of the corresponding sample to get an addition-result value. Regarding each sample in the third group, the harmonic generating circuit 106 replaces the original value by the addition-result value to increase the sample value.

The harmonic generating circuit 106 places a prescribed number of successive samples, which immediately follow every minimum-corresponding sample, in a fourth group. The harmonic generating circuit 106 calculates the difference in value between each sample in the fourth group and the immediately preceding sample. For each sample in the fourth group, the harmonic generating circuit 106 multiplies the absolute value of the calculated difference by the corresponding selected coefficient to get a multiplication-result value. Then, the harmonic generating circuit 106 subtracts the multiplication-result value from the original value of the corresponding sample to get a subtraction-result value. Regarding each sample in the fourth group, the harmonic generating circuit 106 replaces the original value by the subtraction-result value to decrease the sample value.

As previously described, the apparatus 100 (see FIG. 1) receives a sequence of samples of the input digital audio signal. The apparatus 100 detects every local maximum and every local minimum in the waveform represented by the input digital audio signal, and samples corresponding to the detected local maximum and the detected local minimum. Coefficients are assigned to time intervals from maximum-corresponding samples to immediately-following minimum-corresponding samples and those from minimum-corresponding samples to immediately-following maximum-corresponding samples. Each of the coefficients depends on the number of samples in the corresponding time interval. The apparatus 100 calculates the difference in value between every maximum-corresponding sample and a specified sample temporally adjacent to the maximum-corresponding sample or the difference in value between every minimum-corresponding sample and a specified sample temporally adjacent to the minimum-corresponding sample. The apparatus 100 multiplies the absolute value of the calculated difference by the corresponding coefficient to get a multiplication-result value. The apparatus 100 adds or subtracts the multiplication-result value to or from the original value of the specified sample to get an addition-result value or a subtraction-result value. For the specified sample, the apparatus 100 replaces the original value by the addition-result value or the subtraction-result value. Thereby, the apparatus 100 shapes the original waveform represented by the input digital audio signal. The shaping of the original waveform generates even-order harmonics only or even-order and odd-order harmonics, and adds the generated harmonics to the original waveform. As a result, the apparatus 100 enhances the quality of audio contents represented by the input digital audio signal.

Second Embodiment

Figure 7:
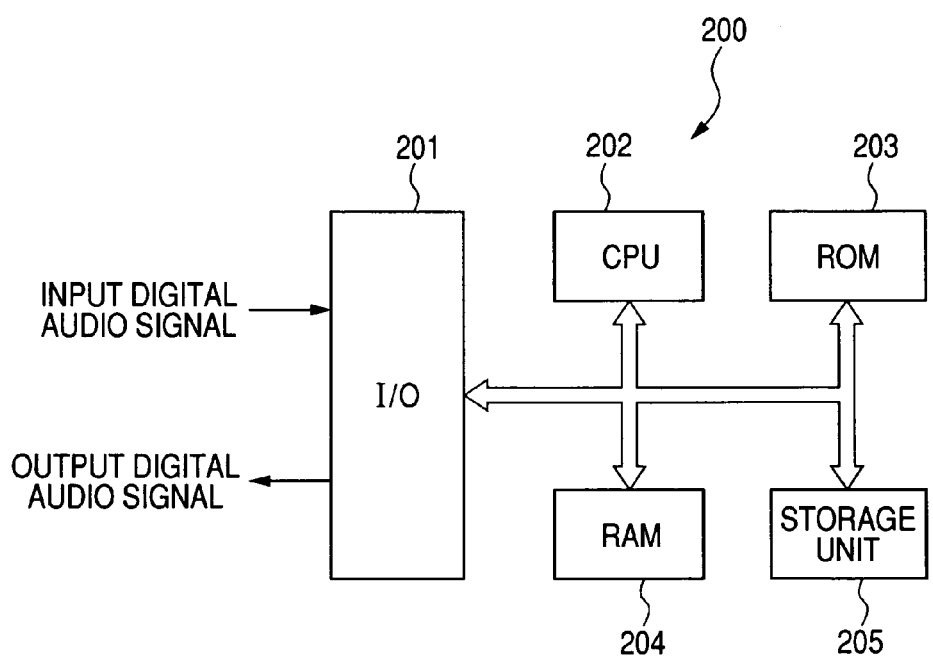
FIG. 7 is a block diagram of a digital audio signal processing apparatus according to a second embodiment of this invention.

FIG. 7 shows a digital audio signal processing apparatus 200 according to a second embodiment of this invention. The apparatus 200 is similar to the apparatus 100 (see FIG. 1) except for design changes mentioned hereafter.

The apparatus 200 includes a computer, a digital signal processor, or a similar device having a combination of an input/output port 201, a CPU 202, a ROM 203, a RAM 204, and a storage unit 205. The input/output port 201 receives an input digital audio signal. The apparatus 200 converts the input digital audio signal into an output digital audio signal through a waveform shaping process. Specifically, the apparatus 200 corrects specified ones among samples of the input digital audio signal while holding the other samples as they are. The corrected samples and the non-corrected samples constitute the output digital audio signal. The input/output port 201 feeds the output digital audio signal to an apparatus output terminal or an external device (not shown). The storage unit 205 includes, for example, a combination of a hard disk and a drive for the hard disk.

The apparatus 200 (or the CPU 202) operates in accordance with a computer program stored in the ROM 203, the RAM 204, or the storage unit 205. The computer program may be read from a recording medium before being sent to the RAM 204 or the storage unit 205 via the input/output port 201 and being written therein. Alternatively, the computer program may be downloaded into the RAM 204 or the storage unit 205 from a server via a network and the input/output port 201. The computer program contains a table of coefficients assigned to different inter-extremum sample numbers.

Figure 8:
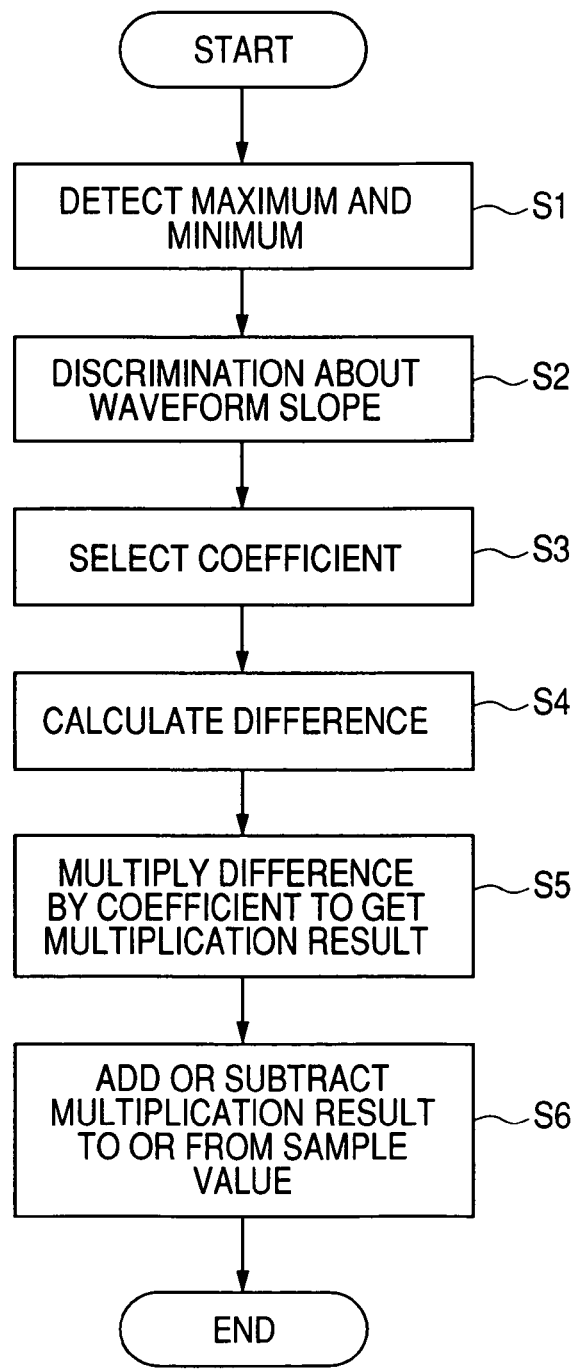
FIG. 8 is a flowchart of a computer program for the apparatus in FIG. 7.

FIG. 8 is a flowchart of a segment of the computer program for the apparatus 200. The program segment in FIG. 8 is iteratively executed in synchronism with a sequence of samples of the input digital audio signal. Specifically, the program segment is executed for every sample of the input digital audio signal.

As shown in FIG. 8, a first step S1 of the program segment decides whether or not the second latest sample is a maximum-corresponding sample. When the second latest sample is a maximum-corresponding sample, the step S1 stores information about the maximum-corresponding sample into the RAM 204 for later use. The stored information represents the time position and the value of the maximum-corresponding sample. In addition, the step S1 decides whether or not the second latest sample is a minimum-corresponding sample. When the second latest sample is a minimum-corresponding sample, the step S1 stores information about the minimum-corresponding sample into the RAM 204 for later use. The stored information represents the time position and the value of the minimum-corresponding sample. Specifically, the step S1 reads the second and third latest samples from the RAM 204. Then, the step S1 compares the values of the latest, second latest, and third latest samples to implement the decisions about a maximum-corresponding sample and a minimum-corresponding sample (extremum-corresponding samples). In more detail, the step S1 subtracts the value of the third latest sample from the value of the second latest sample to get a first subtraction result. The step S1 subtracts the value of the second latest sample from the value of the latest sample to get a second subtraction result. The step S1 checks the signs of the first and second subtraction results. When the first subtraction result is positive and the second subtraction result is negative, the step S1 decides that the second latest sample is a maximum-corresponding sample. On the other hand, when the first subtraction result is negative and the second subtraction result is positive, the step S1 decides that the second latest sample is a minimum-corresponding sample. In the other cases, the step S1 decides that the second latest sample is neither a maximum-corresponding sample nor a minimum-corresponding sample. The step S1 stores the latest sample into the RAM 204 for later use. Furthermore, the step S1 stores information about the time position of the latest sample into the RAM 204. The step S1 corresponds to the maximum detecting section 101 and the minimum detecting section 102 in FIG. 1.

When the step S1 decides that the second latest sample is an extremum-corresponding sample (a maximum-corresponding sample or a minimum-corresponding sample), the program advances from the step S1 to a step S2. Otherwise, the program exits from the step S1 and then the current execution cycle of the program segment ends.

The step S2 retrieves information about extremum-corresponding samples from the RAM 204. By referring to the retrieved information, the step S2 decides whether the time interval between the latest extremum-corresponding sample and the second latest extremum-corresponding sample corresponds to an upward slope or a downward slope in the waveform. When the latest extremum-corresponding sample and the second latest extremum-corresponding sample are a minimum-corresponding sample and a maximum-corresponding sample respectively, the step S2 decides that the time interval therebetween corresponds to a downward slope in the waveform. On the other hand, when the latest extremum-corresponding sample and the second latest extremum-corresponding sample are a maximum-corresponding sample and a minimum-corresponding sample respectively, the step S2 decides that the time interval therebetween corresponds to an upward slope in the waveform. The step S2 corresponds to the waveform slope discriminating section 103.

A step S3 subsequent to the step S2 retrieves the information about the extremum-corresponding samples from the RAM 204. By referring to the retrieved information, the step S3 detects the number of samples between the latest extremum-corresponding sample and the second latest extremum-corresponding sample. The step S3 selects, from the coefficients in the table, one assigned to the detected sample number. The step S3 corresponds to the counter 104 and the coefficient table selecting section 105 in FIG. 1.

A sequence of steps S4, S5, and S6 is subsequent to the step S3. The sequence of the steps S4, S5, and S6 is executed for each of the samples between the latest extremum-corresponding sample and the second latest extremum-corresponding sample.

The step S4 accesses the RAM 204 to check the information about the extremum-corresponding samples and the sample-position information. By referring to the extremum information and the sample-position information, the step S4 reads, from the RAM 204, one of the samples between the latest extremum-corresponding sample and the second latest extremum-corresponding sample. The read sample is labeled as the sample of interest. By referring to the result of the decision by the step S2 and the sample position information, the step S4 decides whether or not the sample of interest is one of specified samples to be corrected which are among successive samples having values in a downward slope in the waveform. In FIGS. 3, 5, and 6, the samples X2, X3, X6, and X7 are specified ones. Furthermore, the step S4 decides whether or not the sample of interest is one of specified samples to be corrected which are among successive samples having values in an upward slope in the waveform. In FIGS. 4, 5, and 6, the samples X0, X1, X4, and X5 are specified ones. When the sample of interest is one of the specified samples, the step S4 calculates the difference in value between the sample of interest and an extremum-corresponding sample (a maximum-corresponding sample or a minimum-corresponding sample) temporally adjacent to the sample of interest.

The step S5 takes the absolute value of the difference calculated by the step S4. The step S5 refers to the coefficient selected by the step S3. The step S5 multiplies the absolute value of the difference by the selected coefficient to get a multiplication-result value. When the step S4 decides that the sample of interest is one of the specified samples, the step S5 is carried out. Otherwise, the step S5 is skipped.

The step S6 refers to the result of the decision by the step S2. The step S6 adds or subtracts the multiplication-result value to or from the original value of the sample of interest to get an addition-result value or a subtraction-result value in response to the result of the decision by the step S2. Regarding the sample of interest, the step S6 replaces the original value by the addition-result value or the subtraction-result value. In other words, the step S6 updates or corrects the sample of interest to the new value, that is, the addition-result value or the subtraction-result value. The step S6 places the corrected sample in the output digital audio signal. When the step S4 decides that the sample of interest is one of the specified samples, the step S6 is carried out. Otherwise, the step S6 is skipped.

The sequence of the steps S4, S5, and S6 is iterated while the sample of interest is changed from one to another among the samples between the latest extremum-corresponding sample and the second latest extremum-corresponding sample. After the sequence of the steps S4, S5, and S6 has been executed for each of all the samples between the latest extremum-corresponding sample and the second latest extremum-corresponding sample, the current execution cycle of the program segment ends.

The steps S4, S5, and S6 correspond to the harmonic generating circuit 106 in FIG. 1. Preferably, the steps S4, S5, and S6 are designed to perform actions equivalent to the operation of one among the previously-mentioned first to eighth examples of the harmonic generating circuit 106.

What is claimed is:

1. A method of using a processor to process a digital audio signal having a sequence of samples having values representative of a waveform, the method comprising the steps of:
comparing values of temporally adjacent samples to detect extrema including local maximums and local minimums in the waveform, and to detect samples corresponding to the detected extrema respectively;
deciding whether values of successive samples between samples corresponding to every two temporally adjacent extrema among the detected extrema are in an upward slope or a downward slope in the waveform;
detecting a number of successive samples between samples corresponding to every two temporally adjacent extrema among the detected extrema;
selecting one from coefficients in response to the detected sample number;
calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;
calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;
multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and
adding or subtracting the obtained multiplication result to or from a value of each of samples among the samples in the first, second, third, and fourth sample groups in response to whether values of successive samples between samples corresponding to every two temporally adjacent extrema among the detected extrema are decided to be in an upward slope or a downward slope in the waveform to generate harmonic components in the digital audio signal;
wherein the first calculating step calculates the first difference only and the second calculating step calculates the fourth difference only, and the adding or subtracting step adds the obtained multiplication result to a value of each of the samples in the first sample group and subtracts the obtained multiplication result from a value of each of the samples in the fourth sample group to generate even-order harmonic components and odd-order harmonic components in the digital audio signal; and
wherein the adding or subtracting step holds a value of each of the samples in the second and third sample groups as it is.

2. A method of using a processor to process a digital audio signal having a sequence of samples having values representative of a waveform, the method comprising the steps of:
comparing values of temporally adjacent samples to detect extrema including local maximums and local minimums in the waveform, and to detect samples corresponding to the detected extrema respectively;
deciding whether values of successive samples between samples corresponding to every two temporally adjacent extrema among the detected extrema are in an upward slope or a downward slope in the waveform;
detecting a number of successive samples between samples corresponding to every two temporally adjacent extrema among the detected extrema;
selecting one from coefficients in response to the detected sample number;
calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;
calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;
multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and
adding or subtracting the obtained multiplication result to or from a value of each of samples among the samples in the first, second, third, and fourth sample groups in response to whether values of successive samples between samples corresponding to every two temporally adjacent extrema among the detected extrema are decided to be in an upward slope or a downward slope in the waveform to generate harmonic components in the digital audio signal;

wherein the first calculating step calculates the second difference only and the second calculating step calculates the third difference only, and the adding or subtracting step adds the obtained multiplication result to a value of each of the samples in the second sample group and subtracts the obtained multiplication result from a value of each of the samples in the third sample group to generate even-order harmonic components and odd-order harmonic components in the digital audio signal; and wherein the adding or subtracting step holds a value of each of the samples in the first and fourth sample groups as it is.

3. A method of using a processor to process a digital audio signal having a sequence of samples having values representative of a waveform, the method comprising the steps of:

comparing values of temporally adjacent samples to detect extrema including local maximums and local minimums in the waveform, and to detect samples corresponding to the detected extrema respectively;

deciding whether values of successive samples between samples corresponding to every two temporally adjacent extrema among the detected extrema are in an upward slope or a downward slope in the waveform;

detecting a number of successive samples between samples corresponding to every two temporally adjacent extrema among the detected extrema;

selecting one from coefficients in response to the detected sample number;

calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and adding or subtracting the obtained multiplication result to or from a value of each of samples among the samples in the first, second, third, and fourth sample groups in response to whether values of successive samples between samples corresponding to every two temporally adjacent extrema among the detected extrema are decided to be in an upward slope or a downward slope in the waveform to generate harmonic components in the digital audio signal;

wherein the first calculating step calculates the first and second differences and the second calculating step calculates the third and fourth differences, and the adding or subtracting step adds the obtained multiplication result to a value of each of the samples in the first and third sample groups and subtracts the obtained multiplication result from a value of each of the samples in the second and fourth sample groups to generate even-order harmonic components only in the digital audio signal.

4. A method of using a processor to process a digital audio signal having a sequence of samples having values representative of a waveform, the method comprising the steps of:

comparing values of temporally adjacent samples to detect extrema including local maximums and local minimums in the waveform, and to detect samples corresponding to the detected extrema respectively;

deciding whether values of successive samples between samples corresponding to every two temporally adjacent extrema among the detected extrema are in an upward slope or a downward slope in the waveform;

detecting a number of successive samples between samples corresponding to every two temporally adjacent extrema among the detected extrema;

selecting one from coefficients in response to the detected sample number;

calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and adding or subtracting the obtained multiplication result to or from a value of each of samples among the samples in the first, second, third, and fourth sample groups in response to whether values of successive samples between samples corresponding to every two temporally adjacent extrema among the detected extrema are decided to be in an upward slope or a downward slope in the waveform to generate harmonic components in the digital audio signal;

wherein the first calculating step calculates the first and second differences and the second calculating step calculates the third and fourth differences, and the adding or subtracting step adds the obtained multiplication result to a value of each of the samples in the second and fourth sample groups and subtracts the obtained multiplication result from a value of each of the samples in the first and third sample groups to generate even-order harmonic components only in the digital audio signal.

5. An apparatus including a processor for processing a digital audio signal having a sequence of samples having values representative of a waveform, the apparatus comprising:

first means for comparing values of temporally adjacent samples to detect extrema including local maximums and local minimums in the waveform, and to detect samples corresponding to the detected extrema respectively;

second means for deciding whether values of successive samples between samples corresponding to every two temporally adjacent extrema among the extrema detected by the first means are in an upward slope or a downward slope in the waveform;

third means for detecting a number of successive samples between samples corresponding to every two temporally adjacent extrema among the extrema detected by the first means;

fourth means for selecting one from coefficients in response to the sample number detected by the third means;

fifth means for calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

sixth means for calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

seventh means for multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and eighth means for adding or subtracting the obtained multiplication result to or from a value of each of samples among the samples in the first, second, third, and fourth sample groups in response to a result of the deciding by the second means to generate harmonic components in the digital audio signal;

wherein the fifth means calculates the first difference only and the sixth means calculates the fourth difference only, and the eighth means adds the obtained multiplication result to a value of each of the samples in the first sample group and subtracts the obtained multiplication result from a value of each of the samples in the fourth sample group to generate even-order harmonic components and odd-order harmonic components in the digital audio signal; and wherein the eighth means holds a value of each of the samples in the second and third sample groups as it is.

6. An apparatus including a processor for processing a digital audio signal having a sequence of samples having values representative of a waveform, the apparatus comprising:

first means for comparing values of temporally adjacent samples to detect extrema including local maximums and local minimums in the waveform, and to detect samples corresponding to the detected extrema respectively;

second means for deciding whether values of successive samples between samples corresponding to every two temporally adjacent extrema among the extrema detected by the first means are in an upward slope or a downward slope in the waveform;

third means for detecting a number of successive samples between samples corresponding to every two temporally adjacent extrema among the extrema detected by the first means;

fourth means for selecting one from coefficients in response to the sample number detected by the third means;

fifth means for calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

sixth means for calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

seventh means for multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and eighth means for adding or subtracting the obtained multiplication result to or from a value of each of samples among the samples in the first, second, third, and fourth sample groups in response to a result of the deciding by the second means to generate harmonic components in the digital audio signal;

wherein the fifth means calculates the second difference only and the sixth means calculates the third difference only, and the eighth means adds the obtained multiplication result to a value of each of the samples in the second sample group and subtracts the obtained multiplication result from a value of each of the samples in the third sample group to generate even-order harmonic components and odd-order harmonic components in the digital audio signal; and wherein the eighth means holds a value of each of the samples in the first and fourth sample groups as it is.

7. An apparatus including a processor for processing a digital audio signal having a sequence of samples having values representative of a waveform, the apparatus comprising:

first means for comparing values of temporally adjacent samples to detect extrema including local maximums and local minimums in the waveform, and to detect samples corresponding to the detected extrema respectively;

second means for deciding whether values of successive samples between samples corresponding to every two temporally adjacent extrema among the extrema detected by the first means are in an upward slope or a downward slope in the waveform;

third means for detecting a number of successive samples between samples corresponding to every two temporally adjacent extrema among the extrema detected by the first means;

fourth means for selecting one from coefficients in response to the sample number detected by the third means;

fifth means for calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

sixth means for calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

seventh means for multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and eighth means for adding or subtracting the obtained multiplication result to or from a value of each of samples among the samples in the first, second, third, and fourth sample groups in response to a result of the deciding by the second means to generate harmonic components in the digital audio signal;

wherein the fifth means calculates the first and second differences and the sixth means calculates the third and fourth differences, and the eighth means adds the obtained multiplication result to a value of each of the samples in the first and third sample groups and subtracts the obtained multiplication result from a value of each of the samples in the second and fourth sample groups to generate even-order harmonic components only in the digital audio signal.

8. An apparatus including a processor for processing a digital audio signal having a sequence of samples having values representative of a waveform, the apparatus comprising:

first means for comparing values of temporally adjacent samples to detect extrema including local maximums and local minimums in the waveform, and to detect samples corresponding to the detected extrema respectively;

second means for deciding whether values of successive samples between samples corresponding to every two temporally adjacent extrema among the extrema detected by the first means are in an upward slope or a downward slope in the waveform;

third means for detecting a number of successive samples between samples corresponding to every two temporally adjacent extrema among the extrema detected by the first means;

fourth means for selecting one from coefficients in response to the sample number detected by the third means;

fifth means for calculating at least one of a first difference and a second difference, the first difference being equal to a difference in value between each sample in a first sample group and a sample immediately following said sample, the second difference being equal to a difference in value between each sample in a second sample group and a sample immediately preceding said sample, the first sample group having one or more samples adjacently preceding a sample corresponding to a detected local maximum, the second sample group having one or more samples adjacently following the sample corresponding to the detected local maximum;

sixth means for calculating at least one of a third difference and a fourth difference, the third difference being equal to a difference in value between each sample in a third sample group and a sample immediately following said sample, the fourth difference being equal to a difference in value between each sample in a fourth sample group and a sample immediately preceding said sample, the third sample group having one or more samples adjacently preceding a sample corresponding to a detected local minimum, the fourth sample group having one or more samples adjacently following the sample corresponding to the detected local minimum;

seventh means for multiplying the calculated at least one of the first difference and the second difference by the selected coefficient and multiplying the calculated at least one of the third difference and the fourth difference by the selected coefficient to obtain a multiplication result for each of samples among the samples in the first, second, third, and fourth sample groups; and eighth means for adding or subtracting the obtained multiplication result to or from a value of each of samples among the samples in the first, second, third, and fourth sample groups in response to a result of the deciding by the second means to generate harmonic components in the digital audio signal;

wherein the fifth means calculates the first and second differences and the sixth means calculates the third and fourth differences, and the eighth means adds the obtained multiplication result to a value of each of the samples in the second and fourth sample groups and subtracts the obtained multiplication result from a value of each of the samples in the first and third sample groups to generate even-order harmonic components only in the digital audio signal.

9. An apparatus including a processor for processing a digital audio signal having a sequence of samples having values representative of a waveform, comprising:

first means for detecting samples corresponding to local maximums and minimums in the waveform;

second means for increasing a value of a first specified sample immediately following each maximum-corresponding sample detected by the first means to correct the first specified sample;

third means for decreasing a value of a second specified sample immediately preceding each minimum-corresponding sample detected by the first means to correct the second specified sample; and fourth means for holding samples, which are in a time interval from each minimum-corresponding sample detected by the first means to an immediately-following maximum-corresponding sample detected by the first means, as they are;

wherein the correction of the first specified sample by the second means and the correction of the second specified sample by the third means add even-order harmonics and odd-order harmonics to the waveform.

10. An apparatus including a processor for processing a digital audio signal having a sequence of samples having values representative of a waveform, comprising:

first means for detecting samples corresponding to local maximums and minimums in the waveform;

second means for decreasing a value of a first specified sample immediately following each minimum-corresponding sample detected by the first means to correct the first specified sample;

third means for increasing a value of a second specified sample immediately preceding each maximum-corresponding sample detected by the first means to correct the second specified sample; and fourth means for holding samples, which are in a time interval from each maximum-corresponding sample detected by the first means to an immediately-following minimum-corresponding sample detected by the first means, as they are;

wherein the correction of the first specified sample by the second means and the correction of the second specified sample by the third means add even-order harmonics and odd-order harmonics to the waveform.

11. An apparatus including a processor for processing a digital audio signal having a sequence of samples having values representative of a waveform, comprising:

first means for detecting samples corresponding to local maximums and minimums in the waveform;

second means for increasing a value of a first specified sample immediately following each minimum-corresponding sample detected by the first means to correct the first specified sample;

third means for decreasing a value of a second specified sample immediately preceding each maximum-corresponding sample detected by the first means to correct the second specified sample;

fourth means for increasing a value of a third specified sample immediately following each maximum-corresponding sample detected by the first means to correct the third specified sample; and fifth means for decreasing a value of a fourth specified sample immediately preceding each minimum-corresponding sample detected by the first means to correct the fourth specified sample;

wherein the correction of the first specified sample by the second means, the correction of the second specified sample by the third means, the correction of the third specified sample by the fourth means, and the correction of the fourth specified sample by the fifth means add even-order harmonics to the waveform.

12. An apparatus including a processor for processing a digital audio signal having a sequence of samples having values representative of a waveform, comprising:

first means for detecting samples corresponding to local maximums and minimums in the waveform;

second means for decreasing a value of a first specified sample immediately following each minimum-corresponding sample detected by the first means to correct the first specified sample;

third means for increasing a value of a second specified sample immediately preceding each maximum-corresponding sample detected by the first means to correct the second specified sample;

fourth means for decreasing a value of a third specified sample immediately following each maximum-corresponding sample detected by the first means to correct the third specified sample; and fifth means for increasing a value of a fourth specified sample immediately preceding each minimum-corresponding sample detected by the first means to correct the fourth specified sample;

wherein the correction of the first specified sample by the second means, the correction of the second specified sample by the third means, the correction of the third specified sample by the fourth means, and the correction of the fourth specified sample by the fifth means add even-order harmonics to the waveform.

* * * * *